June 11, 1935.　　F. A. THOMANN　　2,004,713
HARVESTER
Filed June 20, 1930　　14 Sheets-Sheet 2
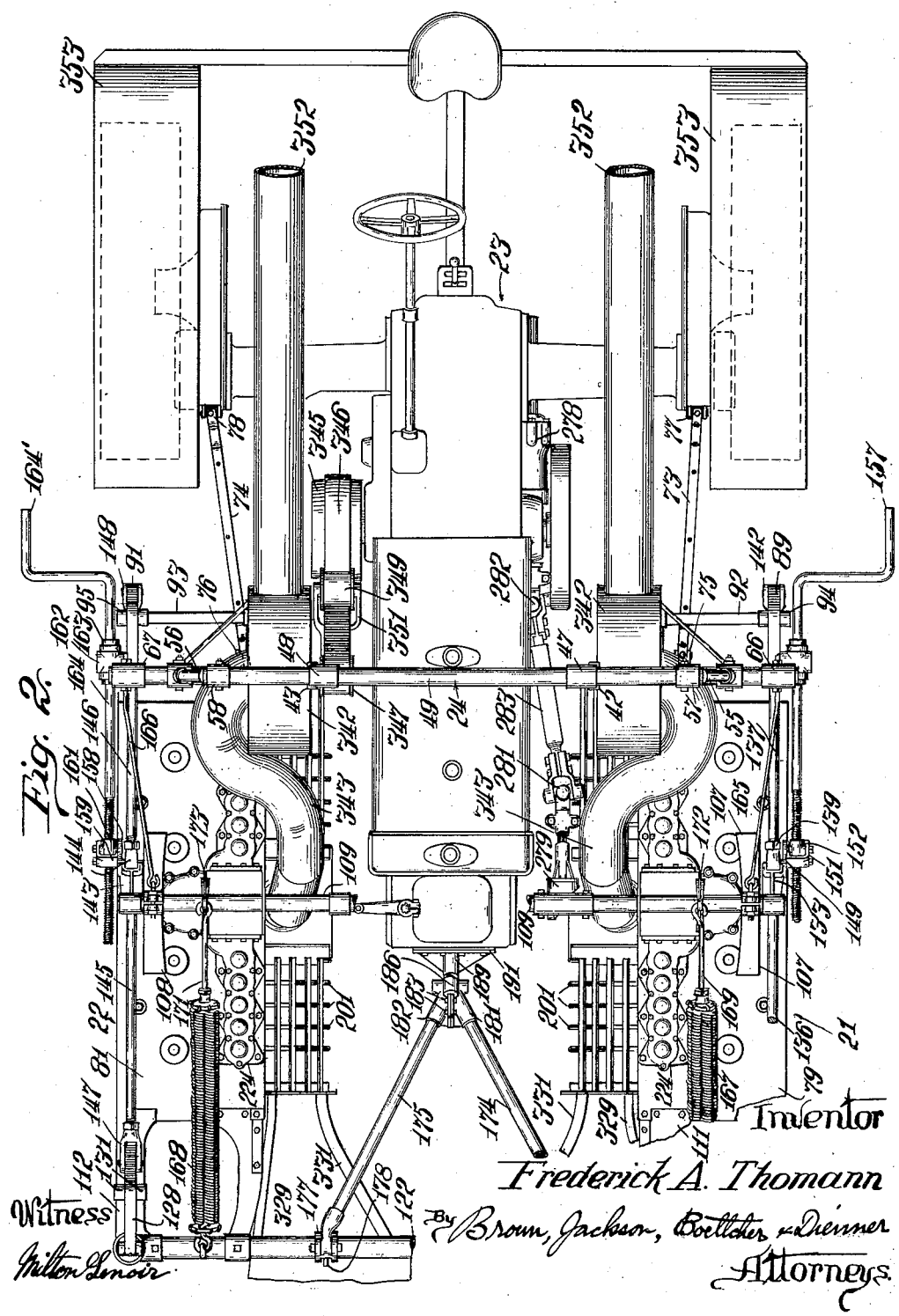

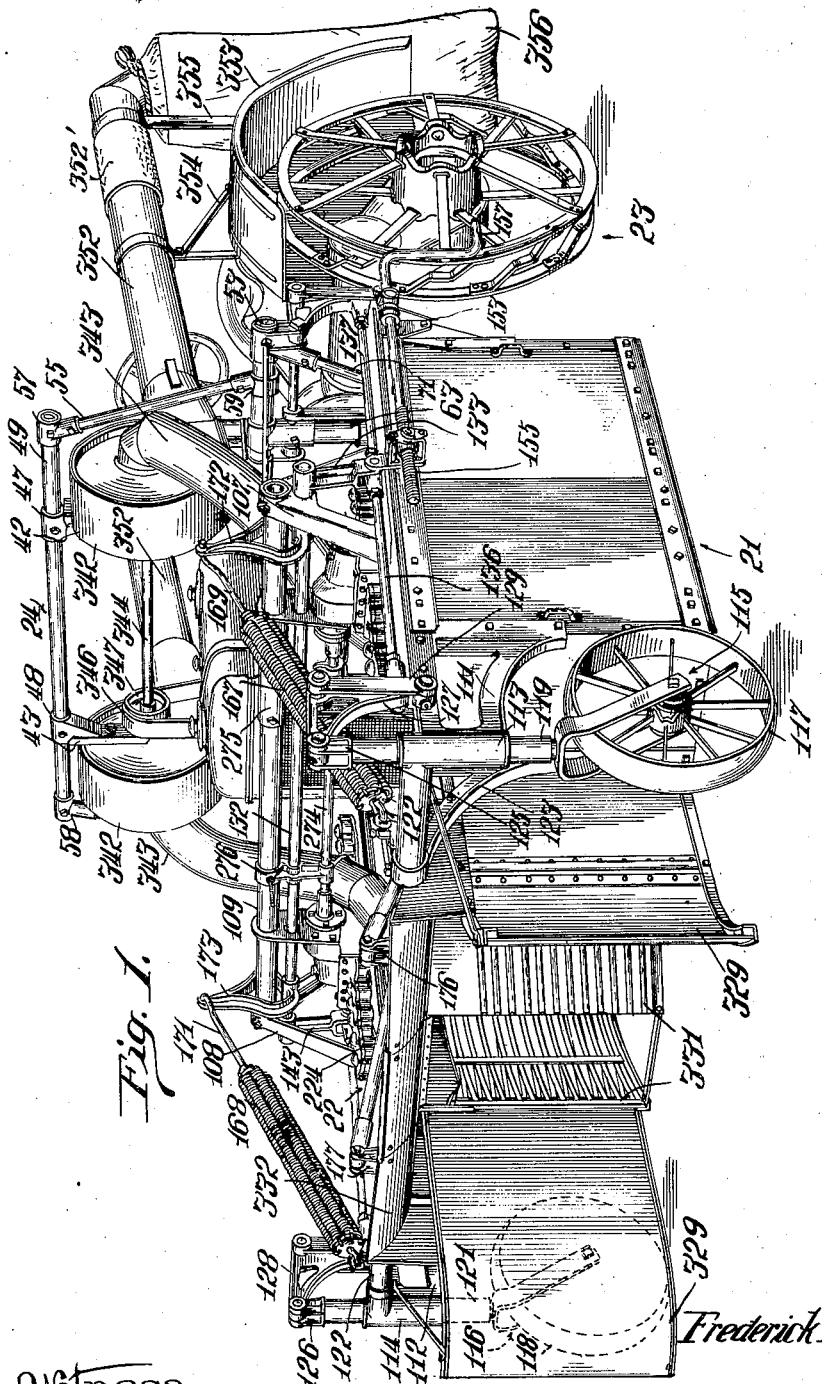

June 11, 1935.   F. A. THOMANN   2,004,713
HARVESTER
Filed June 20, 1930    14 Sheets-Sheet 3
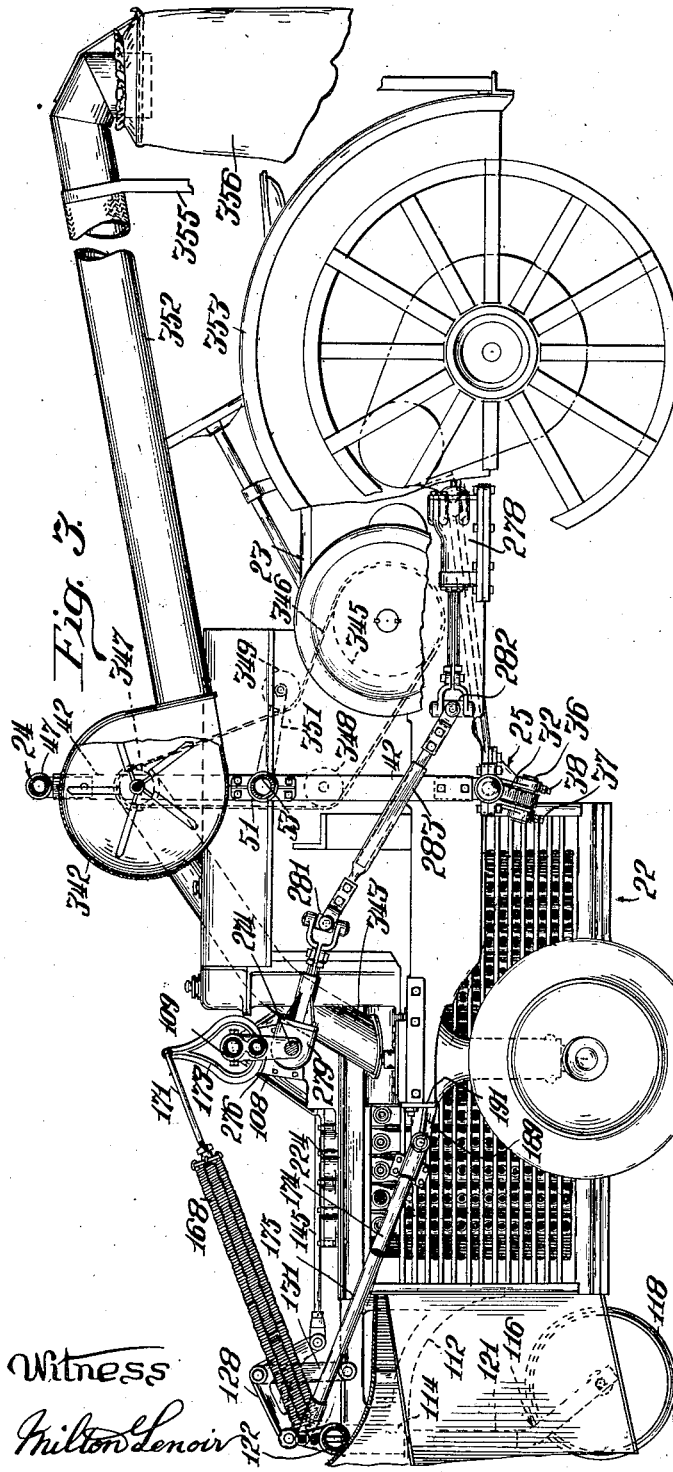
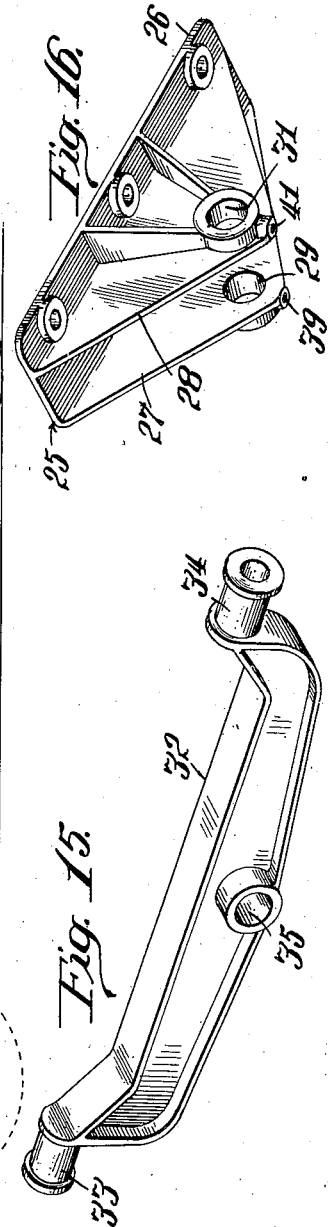
Inventor
Frederick A. Thomann
By Brown, Jackson, Boettcher & Dienner
Attorneys.

June 11, 1935. F. A. THOMANN 2,004,713
HARVESTER
Filed June 20, 1930 14 Sheets-Sheet 4
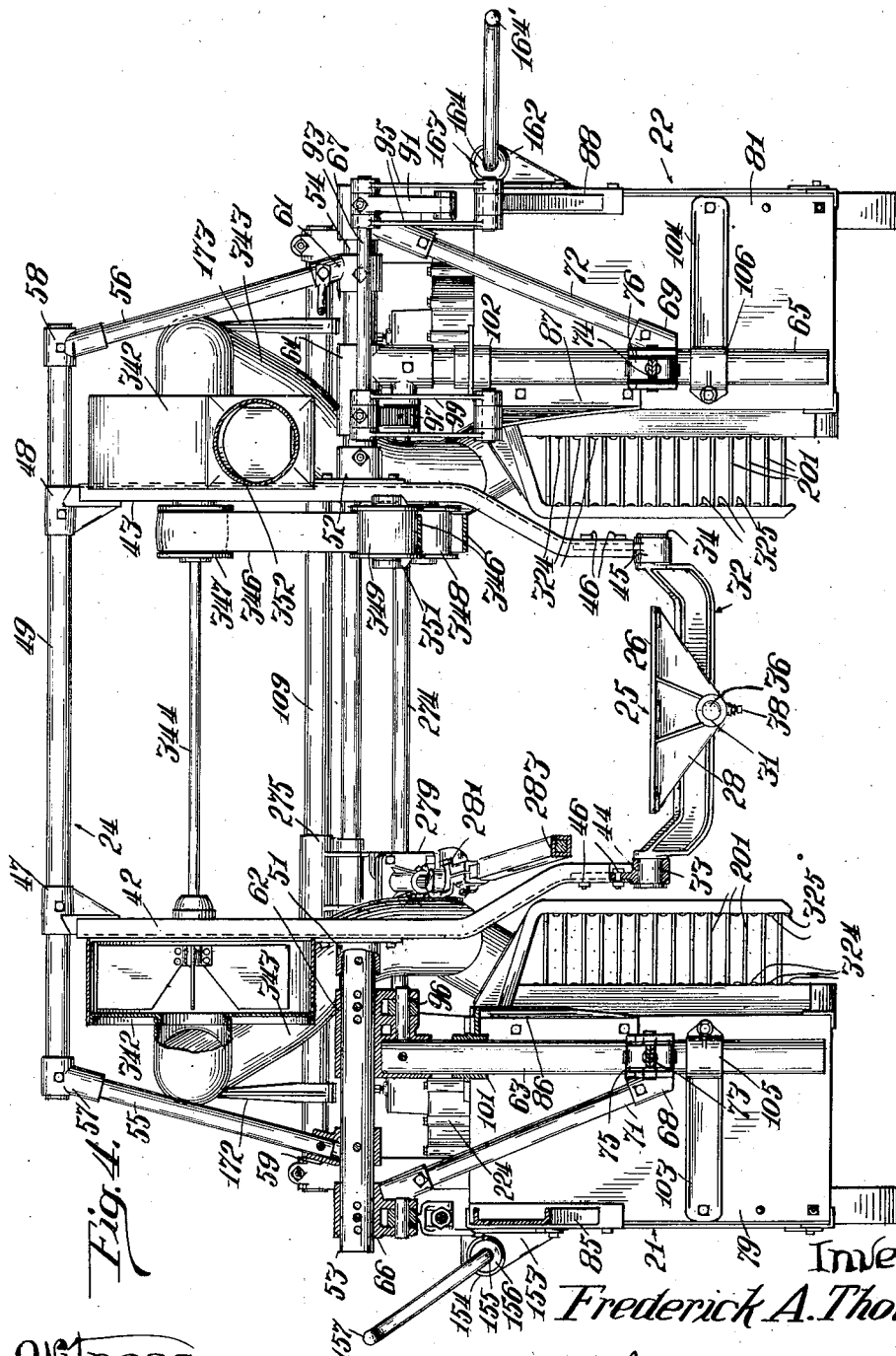

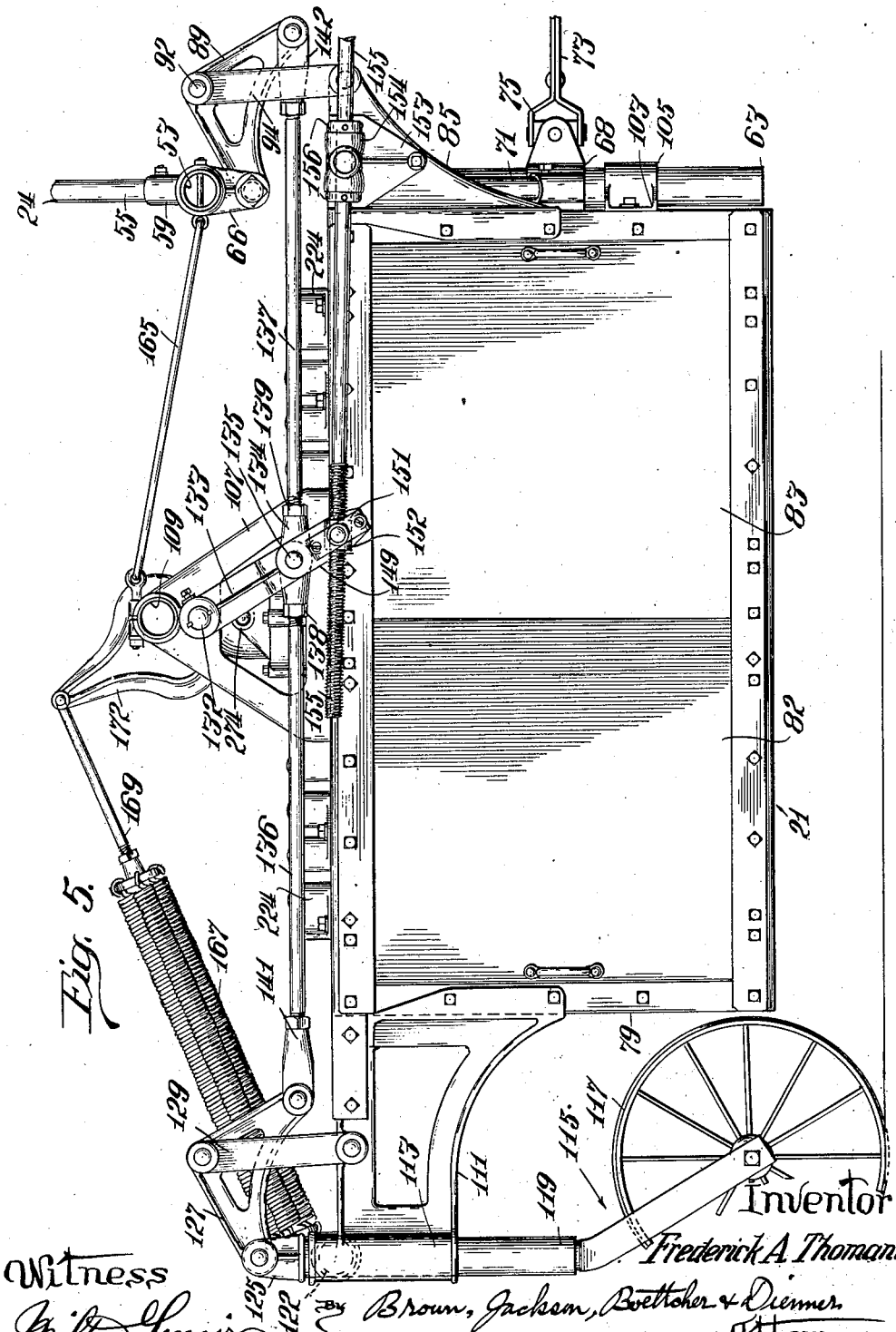

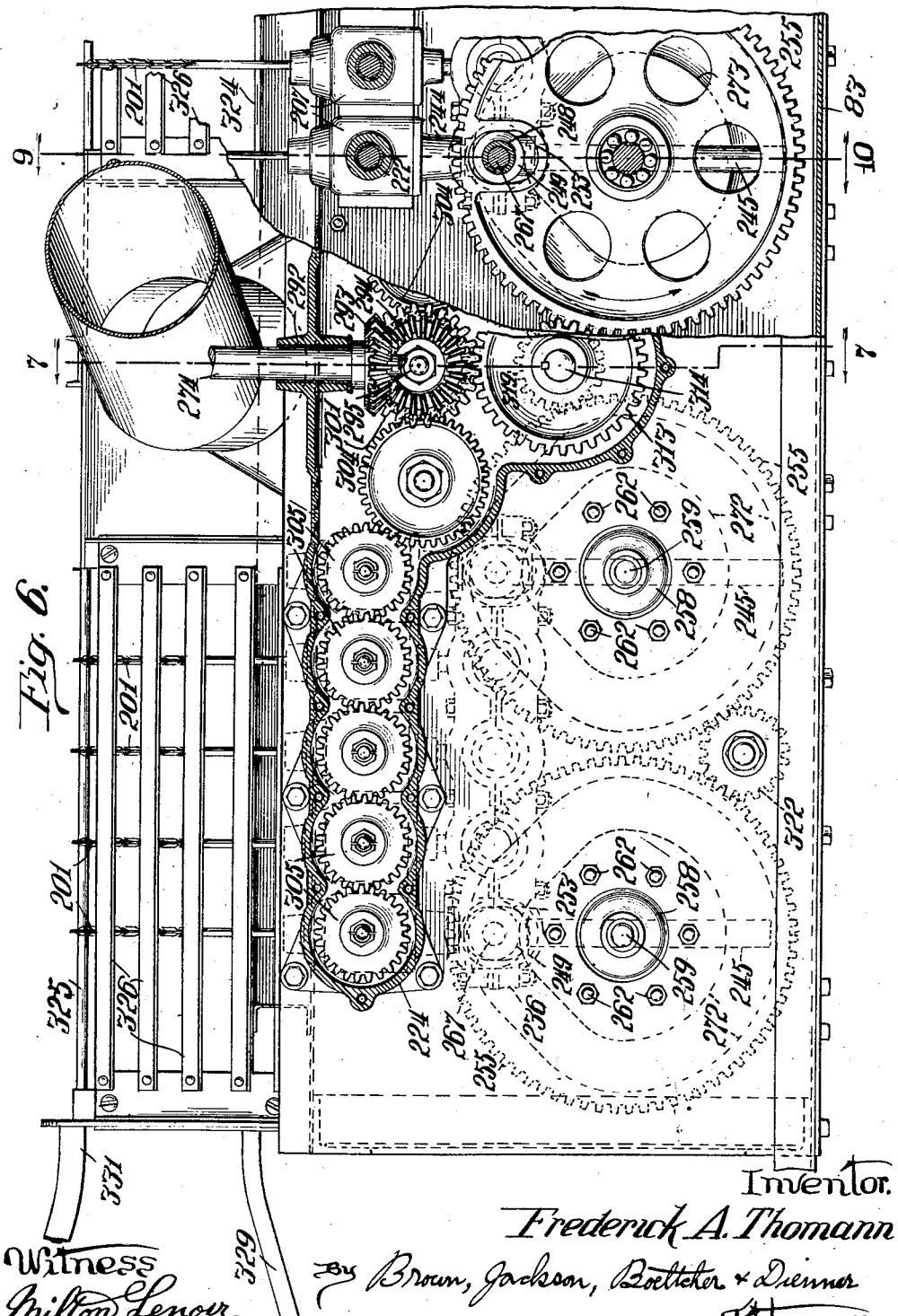

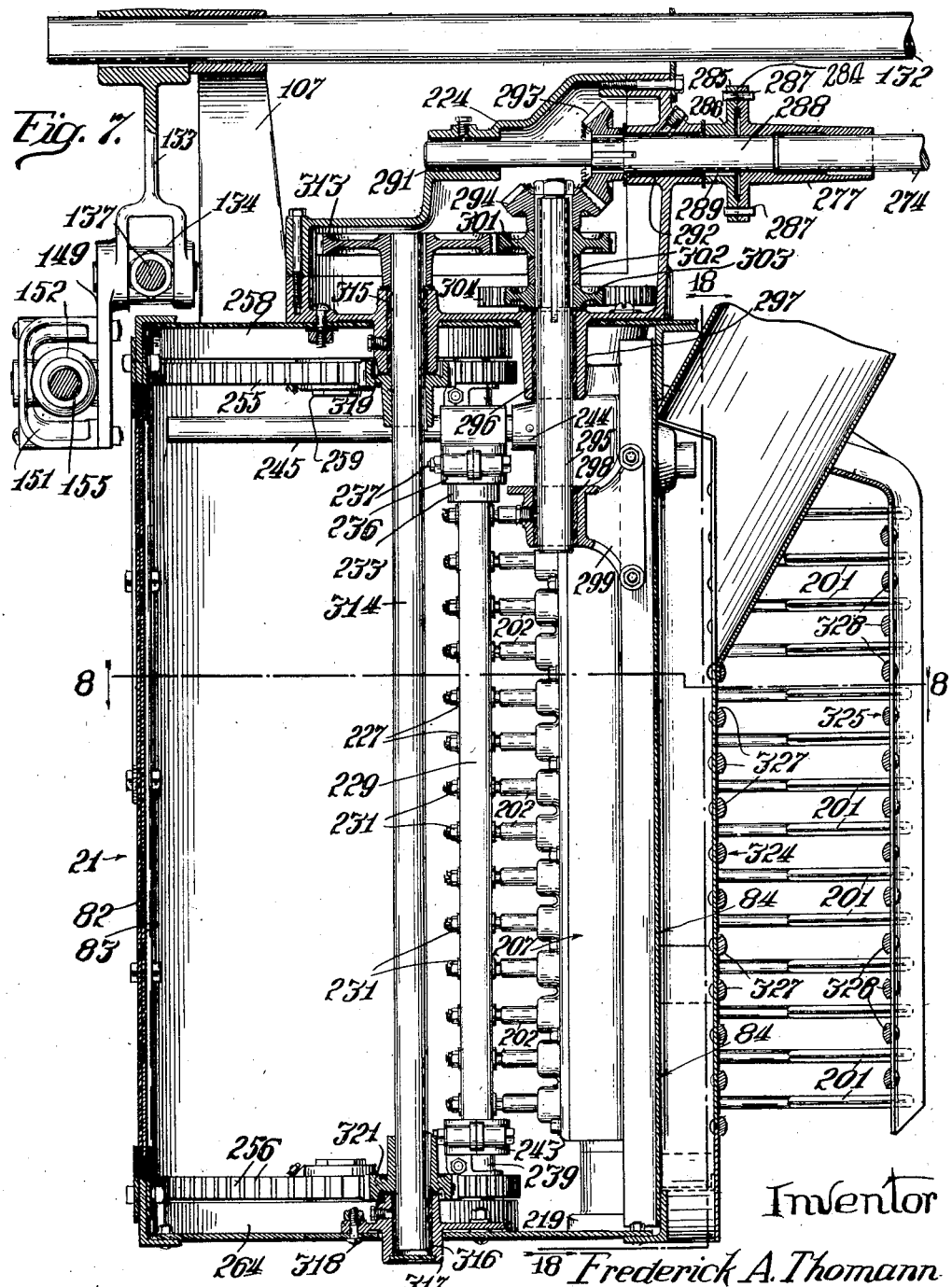

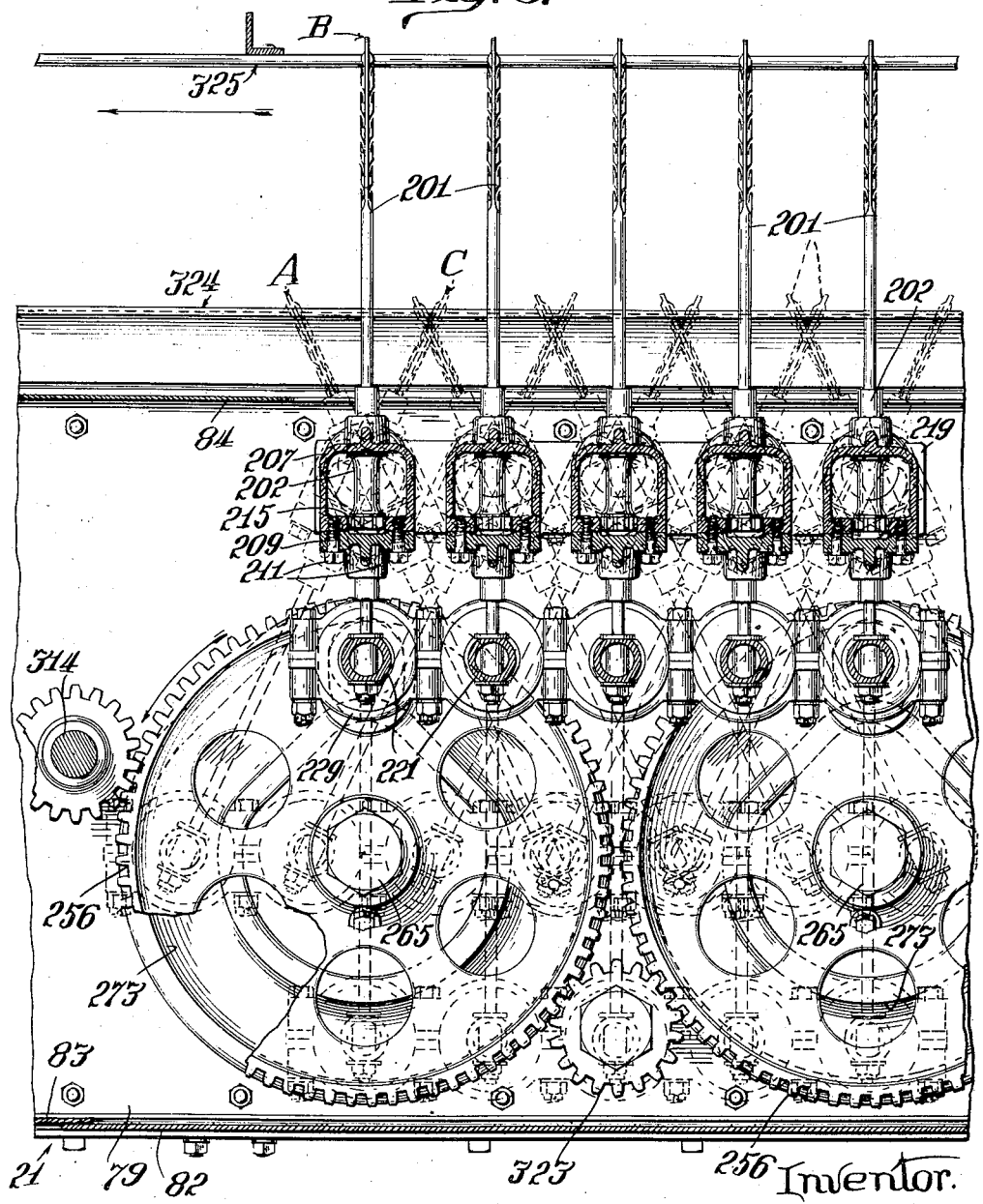

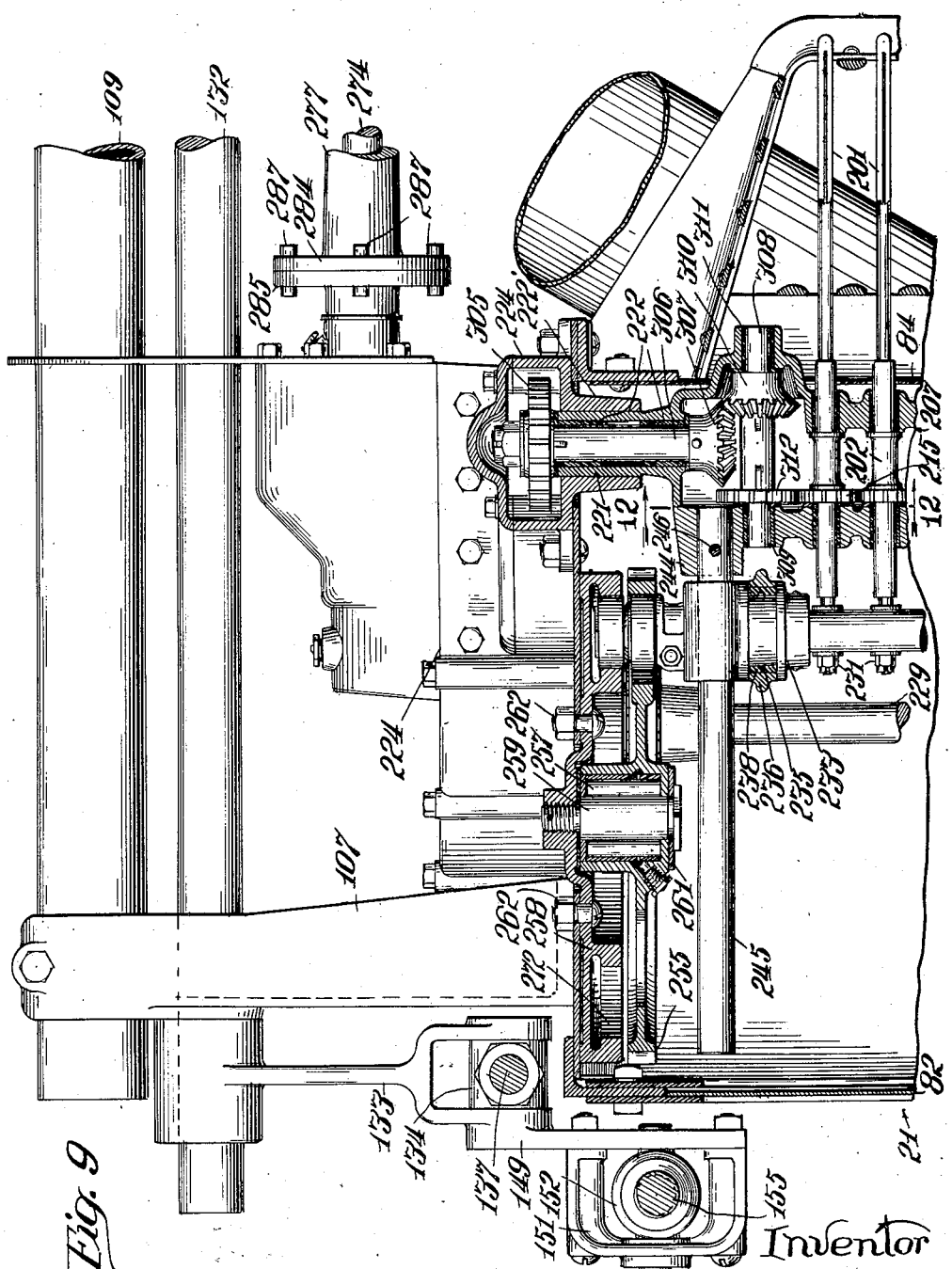

June 11, 1935.  F. A. THOMANN  2,004,713
HARVESTER
Filed June 20, 1930   14 Sheets-Sheet 10
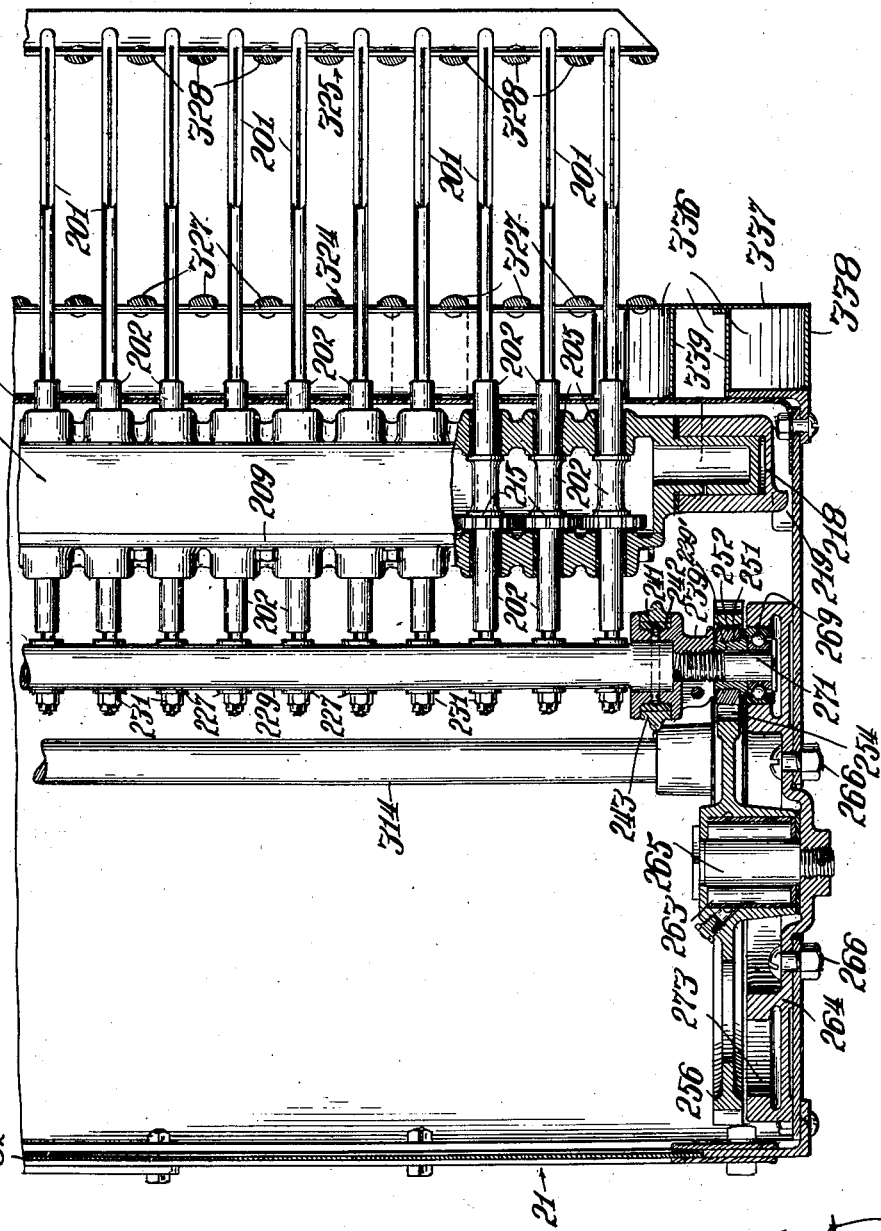
Inventor
Frederick A. Thomann
by Brown, Jackson, Boettcher & Dienner
Attorneys

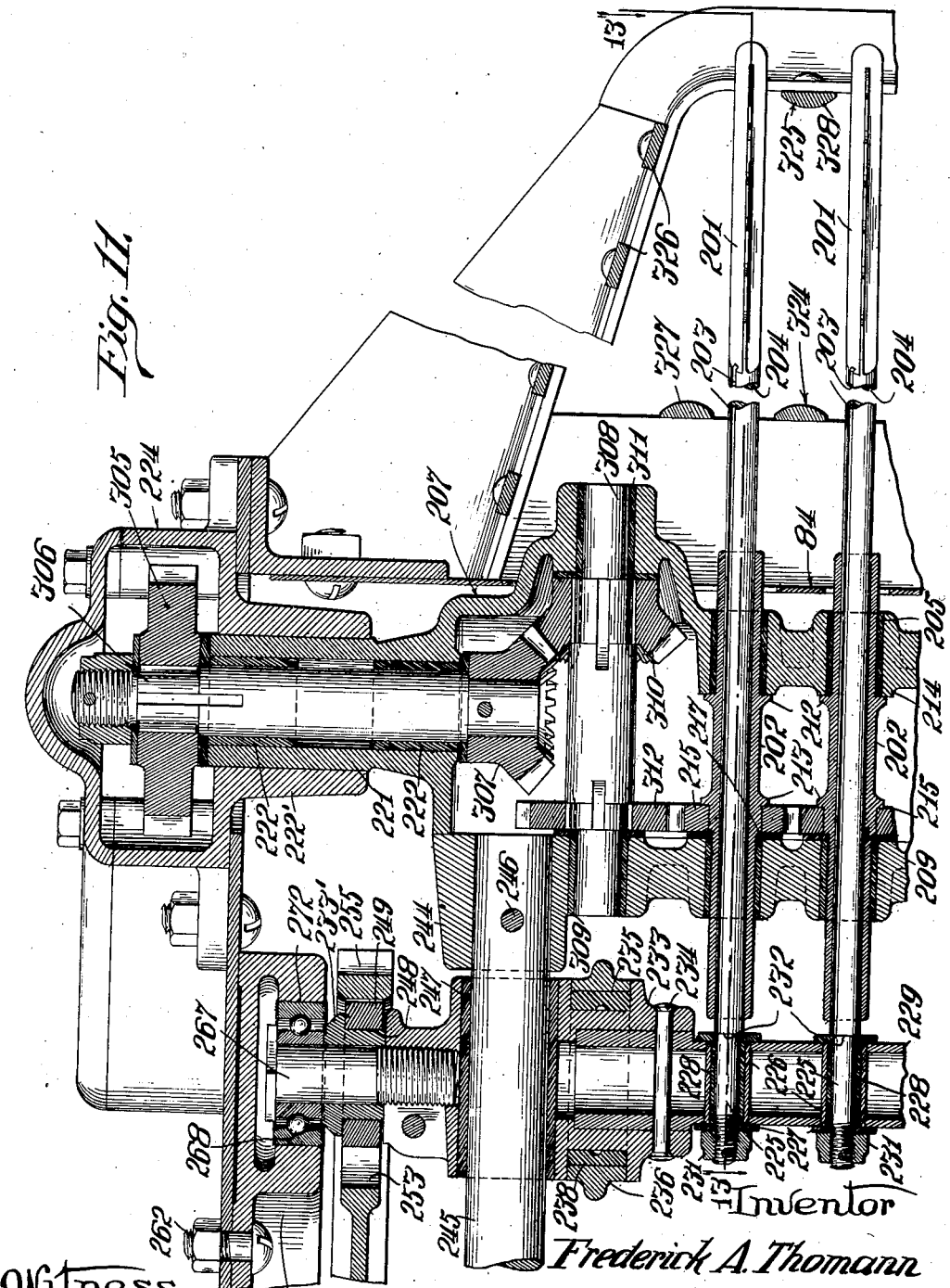

June 11, 1935.  F. A. THOMANN  2,004,713
HARVESTER
Filed June 20, 1930   14 Sheets-Sheet 12
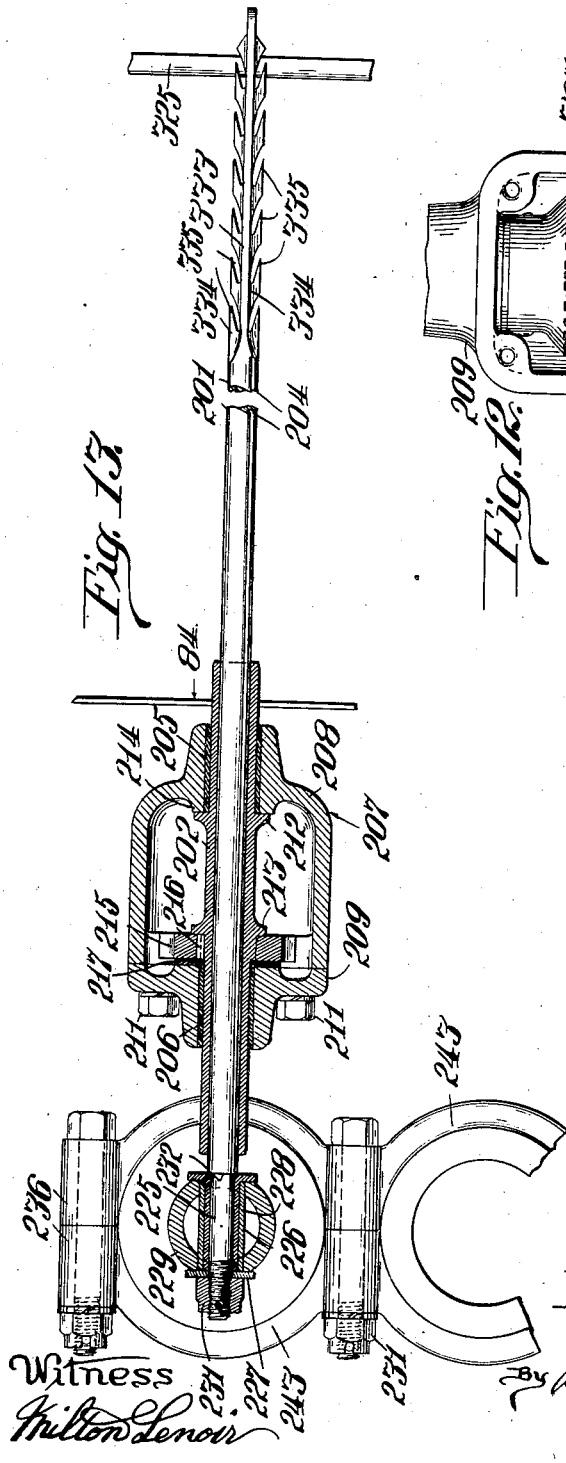
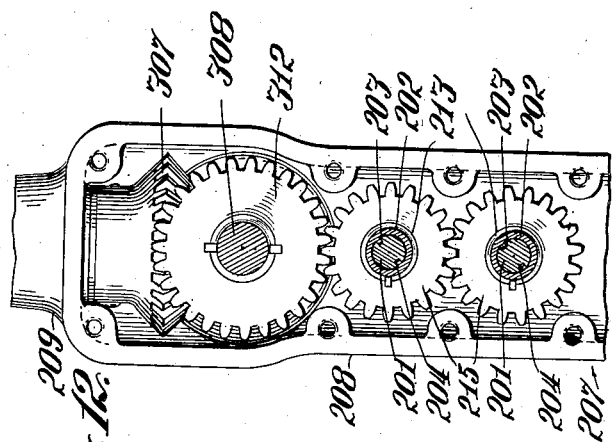
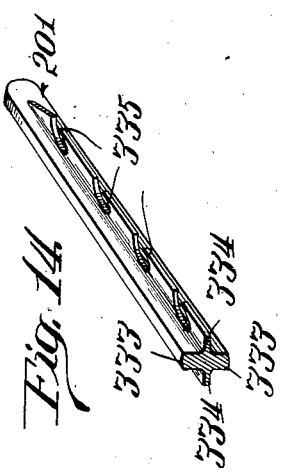
Inventor
Frederick A. Thomann
By Brown, Jackson, Boettcher & Dienner
Attorneys June 11, 1935.  F. A. THOMANN  2,004,713
HARVESTER
Filed June 20, 1930   14 Sheets-Sheet 13
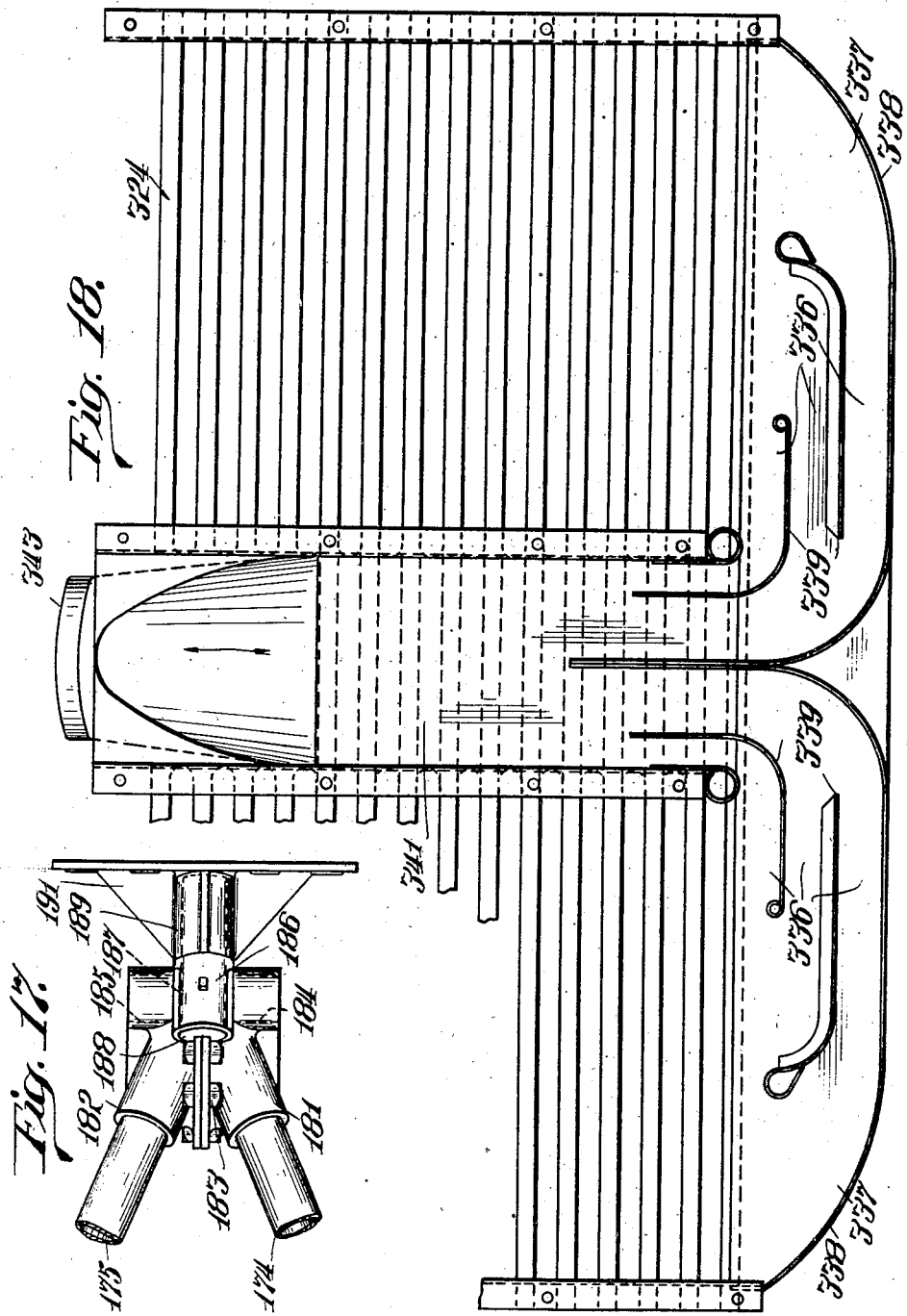
WITNESS
A. D. McLeay.
INVENTOR
Frederick A. Thomann
BY Brown, Jackson, Boettcher & Dienner
ATTYS.

June 11, 1935.　　　　F. A. THOMANN　　　　2,004,713
HARVESTER
Filed June 20, 1930　　14 Sheets-Sheet 14
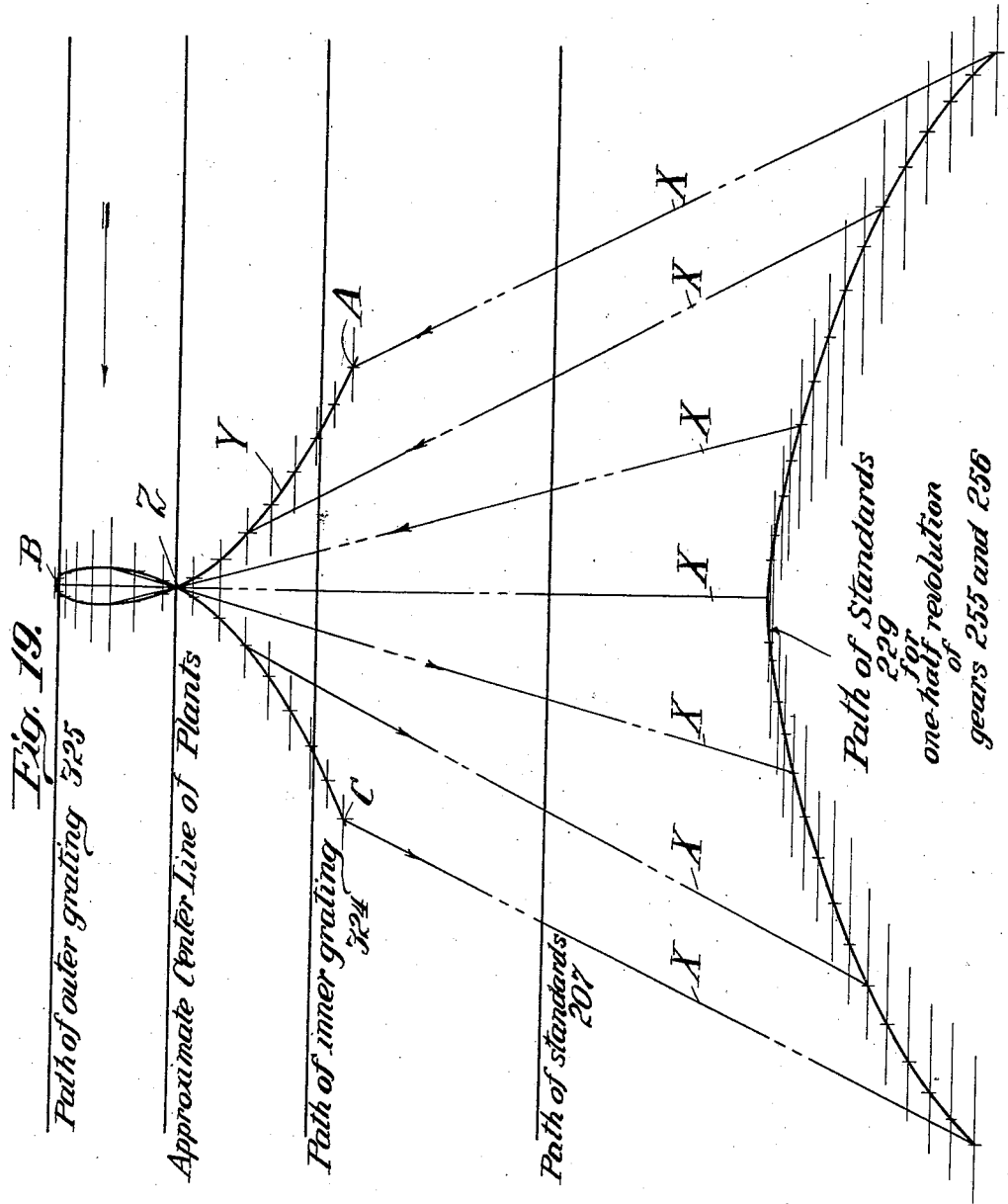

Patented June 11, 1935

2,004,713

UNITED STATES PATENT OFFICE 2,004,713

HARVESTER

Frederick A. Thomann, East Moline, Ill., assignor to Deere & Company, Moline, Ill., a corporation of Illinois Application June 20, 1930, Serial No. 462,516

52 Claims. (Cl. 56—14)

This invention relates to cotton harvesters and more particularly to a cotton picker of the rotating needle type. In the preferred embodiment herein disclosed the harvester is adapted to be carried by a tractor of general utility, but it will be understood that the harvester may comprise its own supporting vehicle. The invention has particular application to two-row harvesters because of the need for increased capacity and rapidity of operation, but it will be understood that the invention may also be embodied in machines for operating upon a greater or less number of rows.

In general, the cotton harvester in accordance with the present invention comprises two picking mechanisms positioned at the front, and on opposite sides of a tractor, each mechanism being adapted to operate on a plant row, thus permitting of simultaneous picking of two adjacent rows. Each mechanism is of the picking finger or needle type comprising one or more sections or banks of needles which are revolved at a comparatively high speed and are arranged to enter the cotton plants where they come in contact with the cotton. Due to the rotation of the needles at a high rate of speed, the cotton is quickly torn or stripped from the bolls and wrapped around the needles. The needles are then withdrawn and the cotton removed therefrom, whence the cotton is adapted to fall into suction vents or other conveying means and is then conveyed to receptacles provided therefor at the rear of said mechanisms.

With the above in view, it is one of the objects of this invention to provide a cotton harvester in the nature of an attachment adapted to be carried by a tractor of general utility. In accordance with the instant invention, the two mechanisms are slidably supported for vertical movement at their rear ends on a frame work in turn supported by the tractor. At its forward end each mechanism is likewise slidably supported upon a caster wheel for vertical movement on the pintle of each. The two mechanisms are joined together by transversely extending members in such a manner as to be restrained from relative lateral movement, so that both mechanisms are practically a unitary structure. Thus, both mechanisms may be quickly and readily attached to a tractor of general utility without involving any material modification or alteration of the tractor structure.

Another object is the provision of a novel mounting wherein the entire mechanism may have a universal movement relative to the tractor. Where the mechanism is adapted to be moved over rough or uneven ground, hillocks or depressions, or where one side of the combined tractor and harvester may be traveling on lower ground than the other with each side encountering ground of irregular contour, the mechanism must still be effective to pick cotton growing close to the ground in order to be efficient to a maximum degree. Under these conditions if both mechanisms were operating as an integral unit without being capable of accommodating themselves as close to the ground as possible, where a depression would be encountered by one side of the mechanism, the mechanism on that side would be incapable of picking cotton growing very close to the ground. To avoid such a condition, a novel mounting has been provided whereby the two mechanisms while rigidly associated may have relative movement with respect to the tractor about a longitudinal axis and also have up and down movement at the forward end of the entire mechanism so as to readily accommodate themselves to the contour of the ground irrespective of the relative position of the tractor.

A further object is to provide a novel elevating and lowering means for both mechanisms so that the mechanisms may be elevated or lowered to meet the requirements of the type of plants being operated upon. In other words, the mechanisms may be elevated to operate upon plants where the cotton bolls are growing at an appreciable distance from the ground, and may be lowered to operate in close proximity to the ground where plants operated upon have the cotton bolls growing close to the ground. Inasmuch as it is desirable to have the entire mechanism move as a unity, the raising and lowering mechanism is such as to provide equal vertical movement to each of the two mechanisms both fore and aft. This is accomplished by the provision of a novel bell crank arrangement operatively associated with a centrally disposed shaft and lever connected to one end of each bell crank by rigid link connections. The other ends of the bell cranks are pivotally connected at the rear with the tractor mount and at the forward end with the casters, the intermediate portions of the bell cranks being connected by links with the body portions of each mechanism. Thus upon a movement of the intermediately supported arm, swinging movement is transmitted to each of the bell cranks by the rigid links, both ends of each mechanism being raised or lowered in parallelism to a line connecting the ends of the bell cranks associated with the mount and casters. In order that the vertical adjustment may be quickly, easily, and readily accomplished, the outer ends of said intermediately disposed levers are provided with nuts for the accommodation of screw rods which impart pivotal movement to said arms thereby effectively controlling the vertical positioning of each of the mechanisms.

A further object is to provide a counterbalancing means for the front ends of the mechanism to obviate any possibility of shock being transmitted to each mechanism as the caster wheels at the forward ends of the mechanisms may suddenly drop into depressions in the ground or may strike sharply arising abutments therein. To this end multiple coil springs are connected to a forward transverse element connecting the two mechanisms, the springs being adapted to be tensioned to a degree sufficient to normally restrain the forward ends of the mechanisms from having sudden shock imparted thereto. The rear ends of the springs are connected to upwardly extending levers rigidly associated with the shaft carrying the vertical adjusting arms so that as the mechanisms are lowered relative to the mount and casters, the springs will be tensioned. Thus, the counterbalancing mediums maintain a tension upon the forward ends of each mechanism so that a counterbalancing effect is maintained upon the forward ends of the mechanisms regardless of the relative lowered positions thereof with respect to the mount and casters. Of course, when the mechanisms are elevated, the springs contract thereby relieving the forward ends of the mechanisms of the tensioned condition.

Another object is the provision of means at the forward end of each mechanism adapted to carry the forward ends of the mechanisms over depressions and elevations which may be encountered due to variations in the contour of the ground over which the combined mechanism is adapted to pass. To this end casters have been provided at the forward end of each mechanism.

A further object is to provide rapidly rotating needles having a reciprocating as well as rotating motion for picking cotton from the plants. Each of the picking mechanisms is provided with rapidly rotating reciprocating needles which are adapted to be projected into and withdrawn from the plants as the mechanism is being moved along said rows, so that as the needles are projected into the plants the cotton is stripped from the bolls, wrapped around the needles due to the rapid rotation thereof, and upon withdrawal of the needles within each mechanism, the cotton is stripped from the needles and received by each mechanism for conveying the stripped cotton to containers provided for the reception thereof.

Another object is to provide a picking mechanism of the rotary needle type, the operation of projection and withdrawal of the needles being such as to eliminate any drag which may be imposed thereupon due to the forward translatory movement of the entire machine as it moves down the rows of plants. It will be evident that if each mechanism were provided with rapidly rotating reciprocating needles adapted to be projected into and withdrawn from the plants only transversely thereof, owing to the movement of the entire mechanism as it advances, while the needles are being projected into and withdrawn from the plants, advancing movement, that is, horizontal movement in a direction of movement of the machine, would be imparted thereto so that the needles would move transversely with respect to the plants and simultaneously have a longitudinal movement with respect to the rows of plants. This longitudinal movement imparted to the needles by the forward movement of the machine creates a transverse drag upon the needles thus subjecting them to undue shearing stresses and materially depreciating their effectiveness. One of the important features of this invention, therefore, is the provision of a novel projecting and withdrawing to the needles, entirely eliminating the above outlined objectionable drag. To this end the needles are projected into the plants at an angle in the direction of movement of the combined machine, with the angle of projection being constantly and uniformly changed to a condition where the needles are at right angles with respect to the longitudinal center of a row acted upon at the maximum outwardly projected positions of the needles, the needles being given an oppositely disposed angularity as they are withdrawn from the plants. In other words, each needle is aimed at and projected into the plant at a single point with respect to the approximate longitudinal center line of the row of plants being operated upon and as the machine advances down the row, the needle is withdrawn from the plant substantially at the same point, so that during any single picking stroke of a needle no advance or forward movement is imparted to the needle with respect to the longitudinal center of the row of plants being operated upon. This novel projecting and withdrawing motion is not only effective to materially conserve the needles as against transverse or shearing stresses but at the same time gives the needle an opportunity to be effective to a maximum degree at the point where maximum efficiency is desired; namely, at the center of the plant where the thicker stalks and more abundant twigs are most likely to be. More concisely stated, each needle, in moving in and out of the plant, executes no movement in the direction of advance of the machine at the point of entry into and retraction from the plants.

A further object is the provision of a sufficient number of needles moving in the manner above outlined to effectively operate upon the plants in such a manner as to pluck or pick the cotton therefrom by covering substantial areas or portions of the plants for each stroke of the picking mechanism. This is accomplished by the provision of several banks or sections of needles arranged in vertical rows, the needles being so disposed in each row and adjacent rows that a given area or portion upon which they operate will be thoroughly acted upon. It will be evident that inasmuch as the picking function of each needle is limited to point piercing of the plants, a sufficient number must be provided to cover a definite area or space in order to efficiently remove cotton from the plants. By the provision of a plurality of banks or sections of needles a substantial area or space is thereby covered by each stroke of the picking needles. These banks or sections are arranged to operate upon the plants progressively as the machine advances down the rows of plants.

Another object is the provision of a novel means whereby the needles are given the above outlined strokes. As stated above, each bank or section comprises vertical rows of needles proximately arranged. Each row of needles is mounted in a housing or standard adapted to be swung about a vertical line. The needles are each mounted in sleeves rotatably journaled in such standard, the needles being each keyed to the sleeves for sliding movement relative thereto and for rotation thereby. Each of the sleeves is provided with an external gear adapted to mesh with a similar gear of the adjacent needle sleeve so that every other needle in any row is given a rotational movement in the same direction while adjacent needles are adapted to be rotated in opposite directions. It will be noted that the needles need not be operated for rotation in the same direction. A suitable common drive shaft may be provided for each row, whereby the needles may be rotated in the same direction. The rear ends of the needles extend outwardly beyond the ends of the sleeves and are provided with reduced ends seated in bushings supported by a vertically disposed standard in parallelism with the needle sleeve housing or standard. The needle rear end supporting standards of each row are connected together for simultaneous and unified movement so that all the needles of each bank or section are projected and withdrawn in unison. The first and last needle rear end supporting standards of each bank or section are mounted for slidable movement along horizontally disposed rods positioned at the upper ends of the respective needle sleeve housings, the rods being rigidly associated with said housings so that the needle rear end supporting members of the first and last rows have sliding movement in the plane of the needles of their respective rows and parallel with the needles of the other rows at all times. The upper and lower ends of the first and last needle rear end supporting standards of each section are journaled in a pair of gears moving in synchronism and the extreme ends of these standards are adapted to be guided in grooves which are adapted to limit the forward and rearward movement of the needles, that is, the projection and withdrawal thereof, and concurrently limit the angular movement imparted to the needles in a horizontal plane. The gearing arrangement for operating the needles is such as to give the needles a very rapid rotation while the rear ends of the needles are given a relatively slow swinging movement in a horizontal plane, the latter movement being so adjusted as to progressively harmonize with the advancing movement of the entire mechanism. The operating gears of each bank are joined together by a common operating pinion for simultaneous operation of said banks. The needles of each row are proximately disposed so that for each stroke of the picking needles a relatively large area or portion of the plants is penetrated.

A further object is the provision of means for conveying the cotton stripped from the needles to receptacles. Each picking mechanism housing is provided at its inner side with a grated housing plate through which the ends of the needle sleeves are adapted to project. Spaced therefrom is a parallel grating which is adapted to coact with another grating, spaced therefrom, to guide the plants therebetween. The needles are adapted to project through the spaces between slats of these latter two gratings so as to pierce the plants which are being led between these gratings. As the needles are withdrawn entirely into the sleeves and the ends of the sleeves strip the cotton from the needles, the cotton falls downwardly between the housing wall and adjacent gratings. The inner grating is secured to the inner side of the picking mechanism and on the side thereof facing the inner side wall of the picking mechanism and between two banks or sections of needles is provided with a vertical duct. At the lower end of the grating, there is provided a trough extending therealong, the trough being provided with three ducts formed by positioning of baffle plates therein. The front and rear sets of troughs or ducts are arranged so as to lead from both ends of the trough to the center thereof and up into the lower end of the vertically disposed central duct. At the upper end the central duct is provided with an outlet pipe extending upwardly. This outlet pipe is connected with an inlet pipe of a blower by a flexible pipe and the outlet or exhaust pipe of the blower is connected to a pipe extending rearwardly of the mechanism, and supported upon the mud guards or fenders of the rear wheels of the tractor. A suitable means is provided for the attachment of receptacles thereto for receiving cotton conveyed rearwardly from each picking mechanism. The cotton dropped by the needles is drawn through the lower ducts, the intermediate or central vertical duct, and through the pipe leading to the blower by suction and is blown out by pressure to the receptacles.

A further object is the provision of a cotton picking mechanism adapted to be mounted on a tractor of general utility and which is driven from the tractor by a power take-off associated with the power means of the tractor.

Other and further objects will appear from the following detailed description of a preferred embodiment of my invention illustrated in the accompanying drawings in which:

Figure 1 is a perspective view of the cotton harvester or picker mounted on a wide tread tractor;

Figure 2 is a plan view of the picker as illustrated in Figure 1;

Figure 3 is an inner side elevation of the right hand picking mechanism with the left hand mechanism cut away;

Figure 4 is a rear view of the picker detached from the tractor with certain parts thereof in section;

Figure 5 is a side elevation of the left hand picking mechanism;

Figure 6 is a top view of the front portion of the left picking mechanism with parts broken away to illustrate certain of the operating elements of the picking needles;

Figure 7 is a cross-sectional view taken along the line 7—7 of Figure 6;

Figure 8 is a fragmentary cross-sectional view taken along the line 8—8 of Figure 7 showing a portion of the rear bank or section of the left picking mechanism;

Figure 9 is a fragmentary cross sectional view taken along the line 9—10 of Figure 6 showing the upper portion of the picker mechanism;

Figure 10 is a fragmentary cross sectional view taken along the line 9—10 of Figure 6 showing the lower portion of the picker mechanism;

Figure 11 is an enlarged cross sectional view of a fragmentary portion of the section shown in Figure 9;

Figure 12 is a cross sectional view taken along the line 12—12 of Figure 9;

Figure 13 is an enlarged cross sectional view taken along the line 13—13 of Figure 11 and showing one of the picking needles and its mounting;

Figure 14 is a fragmentary perspective view of the picking end of a picking needle;

Figure 15 is a perspective view of one of the elements comprising the picker mechanism supporting frame work;

Figure 16 is a perspective view of another of the elements comprising part of the supporting frame work;

Figure 17 is an enlarged fragmentary plan view of the connection of the radius rods of the picker to the front of the tractor;

Figure 18 is an inside view of one of the inner gratings of the picking mechanisms showing the suction ducts as this element appears removed from one of the picking mechanisms; and Figure 19 is a diagrammatic development of the path of movement of the operative end of a needle showing the several positions which a needle takes with respect to the longitudinal center of a row of plants in entering into and withdrawing from a plant as the machine advances down the row.

As illustrated in Figures 1 to 5 of the drawings the machine comprises two picking mechanisms 21 and 22 mounted one each on either side of a wide tread tractor 23 with the forward portions of the picking mechanisms extending forwardly of the tractor.

In order to simplify the detailed description of the machine, I shall first describe the mounting or supporting means therefor including the arrangement for raising and lowering the picking mechanisms relative to the ground.

At their rear ends the picking mechanisms 21 and 22 are supported in a frame 24 carried by the tractor 23. Referring particularly to Figures 3, 4, 15 and 16, the frame 24 is supported on the tractor by a casting 25 comprising a supporting portion 26 having two downwardly extending and angularly disposed flanges 27 and 28 in parallel relation.

The flanges 27 and 28 are disposed with their lower ends extending slightly forwardly and are provided at their lower ends with bearing openings 29 and 31 in alignment with each other and the axes thereof being forwardly and upwardly inclined for a purpose to be hereinafter described. A transverse supporting member 32 provided with offset journal portions 33 and 34 at its ends and a transverse bearing opening 35 centrally thereof is mounted for pivotal movement between the flanges 27 and 28 of the casting 25 on a pivot pin 36 passing through the bearing openings 29 and 31 of the casting 25 and the bearing opening 35 of the transverse supporting member 32, the pin being retained in position in the bearing opening 29 and 31 by means of set screws 37 and 38 seated in threaded openings 39 and 41 respectively in the lower ends of flanges 27 and 28, respectively.

Referring particularly to Figure 4, the supporting frame 24 comprises upwardly extending members 42 and 43 provided at their lower ends with bearing brackets 44 and 45 respectively suitably secured thereto by means of bolts 46, the bearing brackets 44 and 45 being supported on the journals or axle portions 33 and 34 of the transverse supporting member 32. At their upper ends the upwardly extending members 42 and 43 carry brackets 47 and 48 respectively through which a cross member 49 extends with its ends disposed beyond the brackets 47 and 48. Intermediate the upper and lower ends of the members 42 and 43 and on the outer sides thereof, a pair of tubular supporting brackets 51 and 52 are suitably secured and support outwardly extending transverse members 53 and 54 respectively. A pair of brace members 55 and 56 are suitably secured to the outer ends of cross member 49 by brackets 57 and 58 at their upper ends and at their lower ends are suitably secured to the transverse members 53 and 54 by brackets 59 and 61 spaced inwardly from the outer ends of the members 53 and 54. Transverse member 53 carries thereon a bracket 62 disposed between bracket 51 and bracket 59, such bracket supporting a downwardly extending guide member 63 suitably secured thereto. Transverse member 54 is likewise provided with a bracket 64 similarly disposed thereon and carrying a guide member 65 depending therefrom. At their outer ends transverse members 53 and 54 carry brackets 66 and 67 suitably secured thereto and which are connected with brackets 68 and 69 carried by guide members 63 and 65 respectively by brace rods 71 and 72 which serve to brace the guide members 63 and 65. Forward motion is transmitted to the frame 24 by means of thrust rods 73 and 74 (see Figures 2 and 5) which are connected at their front ends by means of universal couplings 75 and 76 respectively to the brackets 68 and 69 respectively and at their rear ends are connected to the rear axle housings of the tractor by means of universal couplings 77 and 78.

The two picking mechanisms 21 and 22 comprise housings 79 and 81, each provided with two sliding doors such as 82 and 83, shown in Figure 5 on the left picking mechanism. These doors are provided on the outer sides of each picking mechanism, and on the inner side each is provided with a grating 84 (see Figures 8, 9, and 10) through which the picking needles project.

At its rear end, housing 79 is provided with two supporting brackets 85 and 86 bolted to the back thereof, and two similar brackets 87 and 88 are bolted to the back of housing 81 (see Figure 4). The rear ends of the housings 79 and 81 are supported from the outer ends of frame members 53 and 54 by means of bell cranks 89 and 91, the forward ends of which are pivotally connected with downwardly depending portions of brackets 66 and 67 respectively. The intermediate portions of the bell cranks 89 and 91 are connected to brackets 85 and 88 by means of pins 92 and 93 extending therethrough and through the upper ends of downwardly extending links 94 and 95, the lower ends of which are connected to the brackets 85 and 88 respectively. Pins 92 and 93 extend inwardly and at their inner ends carry arms 96 and 97 secured thereto at their rear ends, the front ends of these arms being pivotally connected to brackets 62 and 64. Pairs of links 98 and 99 are pivotally connected to the inner ends of pins 92 and 93 at their upper ends and at their lower ends are pivotally connected with brackets 86 and 87.

Two brackets 101 and 102 are secured one each to the tops of housings 79 and 81, respectively, and have bearing portions extending beyond the rear ends of the housings which embrace guide members 63 and 65 and are adapted to have sliding movement thereon as the picking mechanisms are raised or lowered. Secured to the rear end of each housing 79 and 81 are brackets 103 and 104 provided with bearing portions 105 and 106, respectively, also embracing guide members 63 and 65 adjacent the lower ends thereof and are likewise adapted to have sliding movement thereon as the picking mechanisms are raised or lowered.

Intermediate the ends of the housings 79 and 81 and secured thereto along the top outside edge of each are brackets or castings 107 and 108, the upper ends of which are connected together by a cross member 109 suitably secured thereto thereby connecting the two picking mechanisms 21 and 22 together approximately at their central portions.

The housings 79 and 81 are provided along their forward outer corners and adjacent the tops thereof with forwardly extending brackets 111 and 112 suitably secured thereto and being provided at their forward ends with vertical journal bearings 113 and 114, respectively. Casters 115 and 116 having wheels 117 and 118 and upwardly extending pintles 119 and 121 are adapted to support the forward ends of the picking mechanisms 21 and 22, the pintles 119 and 121 extending through the bearings 113 and 114. A cross member 122 connects the two bearing portions 113 and 114 of the front brackets 111 and 112 together, thereby connecting the two picking mechanisms 21 and 22 together at their forward ends. Along the inner front edges of each housing 79 and 81 and adjacent the top of each, additional brackets 123 and 124 are suitably secured. These brackets extend forwardly and are provided at their forward ends with portions embracing the cross member 122 thereby substantially reinforcing the front brackets 111 and 112 and at the same time lending themselves to the securement of substantial rigidity of the front portions of the picking mechanisms 21 and 22. The upper ends of pintles 119 and 121 extend upwardly beyond the upper ends of the bearings 113 and 114 and are each provided with U-shaped fixtures 125 and 126, the legs of which extend upwardly and are provided with journal portions. Brackets 111 and 112 are each connected to their respective caster pintles by means of bell cranks 127 and 128, the intermediate portions of which are pivotally connected with the brackets 111 and 112 by means of links 129 and 131 and the forward ends of which are pivotally connected with the U-shaped fixtures 125 and 126, respectively.

Brackets 107 and 108 have journaled therein below the cross member 109, a transverse shaft 132 having its ends extending outwardly beyond the outer faces of brackets 107 and 108. Referring particularly to Figure 5, the left end of the shaft 132 has keyed thereto a downwardly extending arm 133, the lower end of which is forked and carries between the legs of the fork and adjacent the ends thereof, a fitting 134 pivoted therebetween on a pin 135 extending through both legs of the fork.

The fitting 134 is provided with internally threaded recesses into which rods 136 and 137 are adapted to be threaded and locked against unthreading by means of lock nuts 138 and 139, respectively. The forward end of rod 136 has threaded thereon a forked member 141, the legs of which are pivotally connected to the rear end of bell crank 127. The rear end of rod 137 has threaded thereto a similar forked member 142 the legs of which are pivotally connected to the rear end of bell crank 89. The right-hand end of shaft 132 is similarly provided with an arm 143, fitting 144, rods 145 and 146 and forked members 147 and 148, member 147 being pivotally connected to bell crank 128 and member 148 being pivotally connected to the rear end of bell crank 91. (See Figure 2).

The outer leg of the fork of arm 133 has depending therefrom in alignment with the arm 133 and secured thereto an extension 149 having a bracket 151 secured to the outer face thereof and an internally threaded nut 152 is mounted for pivotal movement about a transverse axis between bracket 151 and extension 149. Rear bracket 85 has mounted on the outer side thereof an outwardly extending bracket 153 provided with a universally mounted journal member 154 in which a crank screw 155 is journaled and retained therein against longitudinal movement by means of a pair of collars 156 suitably secured thereto in abutment with the ends of the journal member 154. The crank handle portion 157 of the crank screw 155 is rearwardly disposed and the forward end thereof is threaded through the nut 152. It will be evident that upon rotation of the crank screw 155 in either direction, the arm 133 may be moved to rock the shaft 132.

Arm 143 of the right-hand picking mechanism 21 is similarly provided with an extension 158, bracket 159, and nut 161, and mechanism 22 is similarly provided with a bracket 162, journal member 163, crank screw 164 and crank handle 164'. It will be understood, of course, that the two crank screws 155 and 164 are intended to be operated simultaneously, but inasmuch as both screws operate members, namely, arms 133 and 143, which are keyed to the same shaft 132, it will be evident that one of these crank screws may be omitted if desired.

It will be evident, that by turning the crank screws 155 and 164 in either direction thereby imparting movement to the arms 133 and 143, swinging movement will be imparted to the front and rear bell cranks of both picking mechanism and since the forward ends of the bell cranks are connected to members having fixed positions relative to the ground, namely the casters and supporting frame, the links connecting the intermediate portions of the bell cranks will impart vertical movement to each of the picking mechanisms relative to the casters at the forward ends thereof and the frame work at the rear ends thereof.

In order to provide additional bracing effect to the frame work 24 and the picking mechanisms 21 and 22, a pair of brace rods 165 and 166 are connected to the brackets 107 and 108 at their forward ends, and at their rear ends to brackets 66 and 67 at the outer ends of transverse members 53 and 54, (see Figures 2 and 5).

The weight of the mechanisms 21 and 22 is counterbalanced by means of multiple coiled springs 167 and 168 connected at their forward ends to the forward transverse cross-member 122 while the rear ends thereof are fastened to rods 169 and 171 pivoted to the upper ends of arms 172 and 173 fixed on shaft 132 and spaced thereon slightly inwardly from the brackets 107 and 108. Arms 172 and 173 are pear-shaped and open in the centers thereof, for the passage therethrough of the cross-member 109, and these openings are sufficiently large to permit the arms to have substantial rotative movement with the shaft 132 without interference by the cross-member 109.

In order to prevent weaving of the front ends of the picking mechanisms 21 and 22 with respect to the front end of the tractor, the picking mechanisms also have connection with the front end of the tractor through a pair of radius rods 174 and 175, as illustrated in Figures 1, 2 and 3. These rods are pivotally connected at their front ends to brackets 176 and 177, which are pivoted to the front cross-member 122. The pivotal movement of the brackets 176 and 177 with respect to the rod 122 is limited by means of pins 178 which pass through cross-member 122 and engage in slots cut in the top and bottom of brackets 176 and 177.

Referring particularly to Figures 2 and 17, the rear ends of the rods 174 and 175 terminate and are secured in castings 181 and 182 which are bolted together at 183. Castings 181 and 182 are provided at their rear ends with aligned bearing openings which receive trunnions 184 and 185 on a coupling block 186. Coupling block 186 is provided with a longitudinal bore 187 which receives a pin 188 carried in a bore or bearing portion 189 in a casting 191, bolted to the front end of the tractor. Pin 188 is inclined upwardly so that its axis substantially coincides with the axis of pin 36 supporting the transverse supporting member 32 and the frame 24.

Due to the universal connection through pin 36 and supporting member 32, and the universal connection at coupling block 186, both cotton picking mechanisms 21 and 22, together with the main supporting frame 24 are free to oscillate about a longitudinal axis substantially coinciding with the axes of pins 36 and 188, and also about a transverse axis coinciding with the axes of the journals or axles 33 and 34 of the transverse supporting member 32, with respect to the tractor. It will be evident as the front ends of the cotton picking mechanisms 21 and 22 rise or fall with respect to the tractor, brackets 176 and 177 are free to rotate on the front transverse member 122 within the limits allowed by the pins and slots provided in these brackets, and the coupling block 186 is free to rock fore and aft on the trunnions 184 and 185 to accommodate the forward and rearward movement of the front ends of the mechanisms with respect to their connection with the front end of the tractor. Thus, as the machine moves down the rows of plants any rise or fall which may be encountered by the casters is accommodated and any pivotal movement of the machine about its longitudinal axis due to the encountering of elevations in the contour on the ground by one side of the mechanism or both sides thereof simultaneously is likewise accommodated.

I shall now describe in detail the structure of the picking mechanisms. Since both picking mechanisms 21 and 22 are substantially duplicates of each other, I shall limit this portion of the description to one of them and for purposes of this portion of the description, I have chosen the left-hand picking mechanism 22. It will be understood, of course, that while the internal mechanisms of the two picking mechanisms are duplicates of each other, the parts of the right-hand mechanism are arranged to operate in opposed relation.

Referring now particularly to Figures 6 to 13, inclusive, each picking mechanism comprises two banks or sections of picking needles or fingers 201. I have found that a practical arrangement of these needles for effectively operating upon the general run of cotton plants is best embodied in a construction wherein each bank or section comprises a plurality of vertical rows, five of such rows being shown, each row having a sufficient number of needles to operate on the cotton bearing portions of the plants and with the needles in close relation to engage all of the bolls. It will be evident, of course, that the number of needles in each row and the number of rows comprising each bank or section, and the particular number of banks or sections used may be varied to meet the demand of the particular type of cotton plant which is to be operated upon.

Each needle is positioned in a sleeve 202 in which it may slide, but to which it is keyed to be rotated thereby, as illustrated in Figures 12 and 13. Each sleeve 202 is formed along the boring thereof with two diametrically opposed keys 203 which fit in key-ways 204 in each needle extending lengthwise thereof. The sleeves 202 of each vertical row are journaled in bearings 205 and 206 provided in a vertically disposed standard 207 comprising a housing member 208 and a cover plate 209, bearings 205 being positioned in the housing and bearings 206 in the cover plate. Cover plate 209 is removably secured to the housing 208 by means of bolts 211. Each sleeve 202 is provided with spaced, peripheral, radially extending flanges or shoulders 212 and 213, shoulder 212 bearing against the end of bearing portion 214 of housing 208. Inside the housing member 208 a small gear 215 is keyed to sleeve 202 by means of a key 216, with one face of the gear 215 in abutment with shoulder 213 of the sleeve, the other face of the gear 215 abutting a thrust collar 217 provided on the bearing 206. Thus, sleeves 202 are each positioned within the housing 208 for rotative movement, but are restrained from sliding movement therein. The needles 201 are so positioned in each standard 207 that each gear 215 meshes with the adjacent one so that one drives the other, causing adjacent needles to be rotated in opposite directions, (see Figures 9, 10, 11, and 12).

The lower ends of the standards 207 of each section or bank are pivotally mounted in sockets 218 in a bracket 219 fixed to the bottom of the mechanism housing, as shown in Figure 10, and the upper end is provided with a hollow journal portion 221 journaled in bearings 222 provided in downwardly extending bosses 222' depending from the bottom of a gear casing 224 bolted to the top of the mechanism housing, as shown in Figures 9 and 11.

As illustrated in Figures 11 and 13, needles 201 are each provided at their rear ends with reduced portions 225 which receive bushings 226 and washers 227. The needles of each vertical row at their bushed ends are journaled in bearings 228 provided in a tubular vertical standard 229 and at their extreme ends the needles are threaded to receive nuts 231, these nuts clamping the washers 227 and bushings 226 against shoulders 232 at the reduced portions 225.

The five vertical standards 229 of each section of needles are connected together at their upper and lower ends to be held in definite spaced relationship and to be moved in unison. The upper end of each standard 229 has secured thereto a casting 233 by means of a pin 234. Adjacent the upper end of each standard 229, the casting 233 is provided with a circumferential groove 235 (see Figures 9 and 11).

The standards 229 are supported and held in definite spaced relationship by means of spacing members 236, each comprising two half sections bolted together by means of bolts 237 (see Figure 8). Split bearings 238 are provided in members 236, and these bearings 238 are engaged in the circumferential grooves 235 formed in the castings 233. At their lower ends, standards 229 are each provided with castings 239 retained thereon by means of pins 241 and also provided with circumferential grooves 242. Spacing members 243 similar to spacing members 236, engage respectively in the circumferential grooves 242 formed in the castings 239 (see Figure 10).

The cover plates 209 of the first and fifth vertical standards 207 of each bank or section are each provided at their upper ends with an outwardly extending boss 244, each provided with a bore in which a guide rod 245 is fixed by means of a transverse pin 246, rods 245 extending outwardly therefrom, (see Figures 7, 9 and 11). Castings 233 of the first and fifth standards 207 of each bank or section are each provided with a horizontal bearing 247 which embraces its respective guide rod 245. Thus, the two end standards 229 are directly suspended from the rods 245 and the intermediate standards 229 are suspended upon the castings 236 which inturn are supported on the end standards 229. Above the bearings 247, the castings 233 of the first and fifth standards are each provided with an extension 233' secured thereto by a bolt 267 and provided with a reduced portion forming a circumferential groove 248 in which a collar 249 is carried (see Figure 11). The lower castings 239 of the first and fifth standards 207 likewise each provided with an extension 239' secured thereto by a bolt 271 and provided with a reduced portion defining a circumferential groove 251 which carries a collar 252 (see Figure 10). Collars 249 and 252 engage in elongated openings 253 and 254 provided in gears 255 and 256, respectively, two gears 255 and two gears 256 being provided for each bank or section. Gears 255 are journaled on roller bearings 257 and are suspended from the under side of two plate members 258, respectively, by means of bolts 259 and washers 261. Plate members 258 are in turn bolted to the under side of the top of the picking mechanism housing by means of bolts 262 as shown in Figure 9. The two gears 256 are journaled on roller bearings 263 and are mounted on two plates 264, respectively, by means of bolts 265, as shown in Figures 8 and 10. Plates 264 are in turn bolted to the bottom of the picking mechanism housing on the upper side thereof by means of bolts 266.

Each extension 233' of the first and fifth standards of each section carries thereon and secured thereto by means of bolt 267, a roller bearing 268 (see Figure 11). A similar bearing 269 is bolted to extension 239' of the first and fifth castings 239 by means of bolt 271 (see Figure 10). The outer race-ways of bearings 268 and 269 engage in camming recesses or ways 272 and 273 in the plates 258 and 264, respectively; the shape of each of these recesses or ways is clearly shown in Figures 6 and 8, the outer half being substantially semi-circular and the inner half comprising two slightly inwardly directed portions.

Referring particularly to Figures 3 and 4, both picking mechanisms are driven from a transverse drive shaft 274 journaled in bearings provided in the lower ends of spaced brackets 275 and 276 depending from the cross-member 109. Shaft 274 has a splined connection at each end with a driving flanged member 277 (see Figure 7). Drive shaft 274 is driven from a power take-off 278 deriving power from the engine of the tractor. The drive is through a set of beveled gears (not shown) disposed in a housing 279, the power take-off connection comprising universal joints 281 and 282 and telescopic connection 283, as clearly illustrated in Figure 3. Referring again to Figure 7, the flange 284 of the driving member 277 is connected to the flange 285 of a driven member 286 by means of wooden pegs 287 for shearing purposes in the event of overload of shaft 274. Member 286 is keyed to a jack shaft 288 by means of a key 289, the jack shaft being journaled in bearings 291 and 292 in the gear case 224 mounted on top of the mechanism housing. Jack shaft 288 carries keyed thereto and within the housing a beveled gear 293 which meshes with a beveled gear 294 keyed to a vertical shaft 295 journaled in a bearing 296 seated in a downwardly extending boss 297 on the gear case bottom, and in a bearing 298 seated in a bracket 299 supported from the side of the mechanism housing.

In abutment with and below beveled gear 294, a pinion 301 is keyed to shaft 295, and separated therefrom by a collar 302, a smaller pinion 303 is keyed to shaft 295. Pinion 303 meshes with two idler gears 304, one on each side thereof (see Figure 6), idler gears 304 being suitably journaled in the bottom of the gear case 224. The front idler gear 304 meshes with the rear gear of a train of five gears 305, which drive the five columns of picking needles of the front section of the left picking mechanism. The rear idler gear 304 similarly meshes with the front gear of a similar train of five gears which drive the five columns of picking needles of the rear blank or section of this picking mechanism. As shown in Figures 9 and 11, each gear 305 is keyed to the upper end of a stub shaft 306 journaled in the upper end journal portion 221 of each of the five standards 207. The lower end of each shaft 306 carries pinned thereto a beveled gear 307 which meshes with a beveled gear 310 keyed on a horizontal shaft 308, one such shaft being journaled in bearings 309 and 311 in the upper end of each standard 207 just above the topmost needle. A small gear 312 is keyed to each shaft 308, and meshes with gear 215 on the sleeve 202 of the uppermost needle 201.

Referring now to Figures 6 and 7, pinion 301 meshes with a gear 313 keyed to the upper end of a vertical shaft 314. Shaft 314 is positioned in the center of the picking mechanism and is journaled in a bearing 315 in the bottom of the gear case 224 and in a bearing 316 at its lower end, the latter bearing being mounted in the bottom of the mechanism housing in a bearing bracket 317 secured to the bottom of the mechanism housing by bolts 318. Within the mechanism housing and just below bearing 315, a pinion 319 is keyed to shaft 314, said pinion meshing with the two inner gears 255 of each section of the picking mechanism. Just above the bearing 316, a pinion 321 is keyed to shaft 314 such pinion meshing with the inner gears 256 of each section of the picking mechanism. In each section of each picking mechanism, the outer gear 255 is connected with the inner gear 255 to be driven therefrom by a small intermediate pinion 322 suitably supported from the underside of the top of the mechanism housing and in like manner the outer gear 256 is connected with the inner gear 256 to be driven therefrom by a second small intermediate pinion 323 suitably mounted on the bottom of the mechanism housing, as shown in Figures 6 and 8.

In operation, drive shaft 274 causes the rotation of the needles 201 at a relatively high speed, power being derived through jack shaft 288, beveled gears 293 and 294, shaft 295, pinion 303, gears 304 and 305, stub shafts 306, beveled gears 307 and 310, shafts 308 and gears 312. Concurrently therewith, gears 255 and 256 are rotated at a relatively slow speed, power thereto being transmitted from shaft 295 through pinion 301 and gear 313, shaft 314 and pinions 319 and 321. As gears 255 and 256 are rotated, they carry the standards 229 with them causing them to follow a path defined by the camming recesses or ways 272 and 273 in plates 263 and 264 respectively. Thus, as the needles 201 are rotated at a relatively high speed about their axes, they are reciprocated in the sleeves 202 and are simultaneously oscillated in a horizontal plane about the turning axes of the vertical standards.

While the needles are being operated in this manner, the tractor carrying the two picking mechanisms is guided along two adjacent rows of plants, the plants of each row being led between an inner grating 324 and an outer grating 325, carried on the inner side of each picking mechanism, as illustrated in Figures 4, 7, 9, 10 and 11, the inner grating 324 being spaced a few inches from the inner side 84 of the mechanism housing, and the outer grating 325 being spaced about five inches from the inner grating 324. It will be apparent, of course, that while this particular spacing of the gratings 324 and 325 has been chosen to meet general requirements, this spacing may be varied to meet the requirements of plant conditions of any particular locality where the mechanism is to be employed to accommodate the various types of plants. Gratings 324 and 325 are connected at the top by grating 326, as illustrated in Figures 2, 6, 9 and 11. Gratings 324 and 325 comprise vertical supporting members and horizontally disposed slats 327 and 328 respectively, the latter being sufficiently spaced from each other to permit of projection, withdrawal and oscillation of the needles 201 therebetween. Each mechanism carries at its front end a guiding fender 329 which is connected with the inner grating 324 and is flared outwardly to aid in lifting the plants from the ground and in leading them between the two gratings 324 and 235. Two companion guide fenders 331 are connected with the outer gratings 325 and are flared inwardly to cooperate with guide fenders 329. The guide channel formed by gratings 324 and 325 compresses the twigs of the plants and confines them to a limited passage along the picking mechanisms thereby subjecting them to a thoroughly effective stripping action on the parts of the picking needles. A forwardly extending upwardly flared shield 332 is connected to the front transverse member 122 and is adapted to bend over the taller plants as they enter the space between the inner and outer gratings 324 and 325.

Needles 201 are each provided at their forward ends with diametrically opposed ribs 333 and 334, the former being of substantial thickness and their peripheries being coincident with the periphery of the needle, the latter ribs 334 being provided with forwardly extending teeth or barbs 335. The sleeves 202 have their outer ends extending through the inner side 84 of each mechanism housing, these ends being disposed in the space between the inner side 84 of each mechanism housing and the inner grating 324 for a purpose which will be hereinafter described.

For purposes of more clearly describing the detailed operation of the needles, the two extreme angular positions taken by the needles during operation have been illustrated in dotted lines in Figure 8, the position of projection being indicated at A and the position of retraction being indicated at C, while the maximum projected position is indicated at B being the position assumed by the needles as shown in full lines. It is to be noted that the movement of the needles from position A to C represents a half revolution of gears 255 and 256. The successive positions that the needles take, with respect to the longitudinal center of the plant rows in moving from position A to position C are shown in the diagrammatic development thereof in Figure 19. As the mechanism moves down the row of plants in the direction of the arrow adjacent the top of the figure, the uppermost line of the figure represents the path of movement of the outer grating 325, the next line therebelow represents the approximate center line of the plants, the third line from the top represents the path of movement of the inner grating 324, the fourth line from the top represents the path of movement of the standards 207, and the curved line at the bottom of the figure represents the path of the standards 229 for one-half revolution of the gears 255 and 256. Lines X represent the relative intermittent positions that the needles of a single row assume in moving from position A to position C, position A being the one extreme assumed by these needles when the outer ends thereof are initially projected beyond the inner grating 324. As the gears 255 and 256 carry the inner ends of the needles around and simultaneously project the needles, it will be noted that the outer ends thereof move in the path of the curve Y, and due to the movement of projection and the movement of the machine in advancing, the needles of each vertical row will intersect the approximate center line of the plants of the row acted upon at a single point Z. As the needles of the row approach the limit of projection, which is the position B, the curve Y defined by the ends thereof continues to a point slightly beyond the path of movement of the outer grating 325. When the needles have passed the maximum projected position, namely, B, the curve defined by the ends of the needles likewise passes through the intersection point Z and upon continued withdrawing movement, the balance of the curve defined by the ends of the needles during the retracting period is a duplicate of the curve Y but is disposed in the opposite direction due to the continued advancing movement of the mechanism. It is to be noted that the major portion of the advancing movement of the needles down the row of plants takes place between the path of the inner grating 324 and the approximate center line of the plants with very little of this movement being imparted to the operative ends of the needles as they are projected into and withdrawn from the plants. Thus, by the time the gears 255 and 256 have moved the needles to the other limit of angularity, namely, C, the ends of the needles will be sufficiently withdrawn from the plants so that that portion of advancing movement taking place as the needles approach their limit of retraction causes the curve defined during this period of operation to be likewise disposed in the space between the path of movement of the inner grating 324 and the approximate center line of the plants. Each of the needles therefore enters the plants at a single point along the approximate center line of the plants where the cotton is most abundant. Thus, any drag which would be normally imposed upon the needles due to the advancing movement of the mechanism if they were projected and retracted only perpendicularly to the line of advancing movement is reduced to a minimum. With the drag due to the advancing movement of the mechanism thus substantially reduced, the needles are so permitted to operate at maximum efficiency at the point of the plants where the cotton is most abundant and since the rapid revolving of the needles takes place at a single point for a substantial period of time, the picking ability of the needles is materially increased to a point of maximum efficiency.

The provision of the needles in banks or sections, as above described, permits each mechanism to effectively operate upon substantial portions of the plants guided between the inner and outer gratings so that the plants acted upon are stripped of cotton in a highly efficient manner. The arrangement of the banks or sections is such that each bank operates upon different portions of a plant row successively.

As the needles are drawn from position C around to position A, as shown in dotted lines in Figure 8, the ends of the needles are drawn completely within the sleeves 202 so that the cotton they have picked is stripped from the ends thereof by the ends of the sleeves and dropped down between the inner gratings 324 and the inner wall 84 of the mechanism housing, (see Figure 10). This stripping action takes place quite readily due to the forward projection of the teeth or barbs 335 of the needles 201, the cotton being stripped therefrom in the direction of the free ends of the teeth or barbs.

The inner gratings are each provided at their bottoms with sheet metal troughs or ducts 336 defined by an outer wall 337 and bottom portion 338, each of the ducts 336 being further defined by spaced baffle plates 339, as best shown in Figure 18. The inner ends of the ducts 336 lead into an enclosure 341 extending upwardly between the two banks or sections of needles and which is connected with a suction fan 342 by means of a flexible pipe 343. One such fan is provided for each mechanism and they are supported one each by the vertical members 42 and 43 of the frame 24. The two fans 342 are operatively connected together by means of a driving shaft 344 which is driven from the belt pulley 345 on the tractor by a belt 346 and pulley 347 keyed to the shaft 344. Belt 346 leads over an idler pulley 348 and under a second idler pulley 349 which is suspended from the vertical member 43 by means of an arm 351 (see Figures 3 and 4.) The weight of the pulley 349 serves to take up the slack in the belt 346.

The outlet vents of the fans 342 are provided with pipes 352 connected thereto, the pipes extending rearwardly and each being suitably supported upon the mud guards or fenders 353 of the rear wheels of the tractor by means of brackets 354 and 355. The ends of pipes 352 are shaped to receive bags 356 for the reception of the picked cotton. A suitable tubular screen 352' may be interposed in pipe 352 through which small particles of foreign matter may be dropped in the course of the passage of the picked cotton to the receptacles 356. Such screens will also permit of excessive pressure relief. The picked cotton is thus conveyed by suction from the picking mechanisms to the fans and expelled into the receptacles 356 under pressure.

It will thus be seen that I have provided a cotton harvester in the nature of an attachment adapted to be carried by a tractor of general utility without any material alteration or modification of the tractor being involved and adapted to operate upon two rows of cotton plants; a novel mounting and supporting means has been provided therefore wherein although the two operating mechanisms are connected together to form a substantially integral structure, the mechanism is capable of universal movement relative to the tractor so as to accommodate itself to irregularities in the general contour of the ground over which it may be operated; a novel elevating and lowering means for the entire mechanism has been provided so that the mechanism may be adjusted to meet the requirements of the types of plants being operated upon; a novel arrangement of the picking needles has been provided whereby the needles are given novel projecting and retracting movements, being adapted to enter and to be withdrawn from the plants operated upon and with respect to the center line of a row of plants acted upon at one point so that the advancing movement of the machine will cause no transverse drag upon the needles and whereby the needles are permitted to operate upon that portion of the plants where the picking function may be carried out to a maximum degree of efficiency; the needles of the picking mechanisms have been aranged in a novel manner so that the plants acted upon are thoroughly stripped of cotton; a novel means has been provided to receive and convey stripped cotton rearwardly of the combined tractor and cotton picker mechanism where it may be received by receptacles; and a mechanism has been provided which is operated from the power plant of the tractor carrying the mechanism.

While I have disclosed a preferred embodiment of my invention, I do not wish to be limited thereto. As will be understood by those skilled in the art, changes may be made therein without departing from the essence of the invention or the spirit and scope of the appended claims.

What I claim and desire to secure by Letters Patent is:

1. In a cotton harvester, the combination with a tractor, of an attachment comprising a bracket secured to said tractor centrally thereof, a cotton picking mechanism, an arm pivotally connected to said bracket and extending laterally therefrom, said arm having journal portions on the laterally directed ends thereof, and a frame having laterally spaced members connected to said journal portions and supporting said mechanism on said tractor.

2. In a cotton harvester, the combination with a tractor, of an attachment comprising a bracket secured to said tractor, a cotton picking mechanism, a transversely disposed load carrying arm pivotally connected to said bracket, said arm having spaced journal portions thereon, a frame comprising vertically extending arms, each arm having connection with one of said journal portions, and a member connecting said arms, said frame being adapted to support said mechanism on said tractor.

3. In a cotton harvester, the combination with a tractor, of an attachment comprising a cotton picking mechanism, a frame associated with said mechanism and connected to said tractor, means on said frame for guiding said mechanism for vertical movement, and separate guiding means spaced from said first guiding means and including ground engaging means and parts carried by said mechanism for guiding said mechanism for vertical movement.

4. In a cotton harvester, the combination with a tractor, of an attachment comprising a cotton picking mechanism, a frame associated with said mechanism and connected to said tractor, means on said frame for guiding said mechanism for vertical movement, adjustable means connected to said frame and mechanism for supporting one end of said mechanism, ground engaging means associated with said mechanism for guiding said mechanism for vertical movement, adjustable means connecting said ground engaging means and said mechanism for supporting the other end of said mechanism, and common means for controlling both of said adjustable means for effecting movement of said mechanism relative to the ground.

5. In a cotton harvester, the combination with a tractor, of an attachment comprising a cotton picking mechanism, a frame associated with said mechanism and connected to said tractor, means on said frame for guiding one end of said mechanism for vertical movement, adjustable means connecting said ground engaging means and said mechanism for supporting the other end of said mechanism, and common means for simultaneously controlling both of said adjustable means for effecting movement of both ends of said mechanism in the same direction.

6. In a cotton harvester, the combination with a tractor, of an attachment comprising cotton picking mechanisms disposed upon either side of said tractor, a frame having universal connection with said tractor and slidably supporting one end of each mechanism, casters supporting the other ends of said mechanisms, means connecting said other ends of said mechanisms, and bracing means universally connecting said means with said tractor, said frame universal connection and said bracing means universal connection having axes disposed in alignment with each other whereby said mechanisms pivot in unison with respect to said tractor.

7. A cotton picking mechanism comprising cotton gathering means, means adapted to impart rotary movement to said cotton gathering means, and means operating simultaneously therewith for imparting reciprocatory and oscillatory movement to said cotton gathering means.

8. A cotton picking mechanism comprising cotton gathering means, supporting means for said cotton gathering means restraining the latter to movement in one plane, means adapted to impart rotary motion to said cotton gathering means, and means operating simultaneously therewith for imparting reciprocatory and oscillatory movement to said cotton gathering means in said one plane.

9. A cotton picking mechanism comprising row following means adapted to move along a row of plants, movable cotton stripping means carried thereby, means adapted to strip cotton from said plants, means adapted to project said movable cotton stripping means into and retract the same from said plants laterally of said mechanism, and means for imparting angular movement to said cotton stripping means in a plane including the direction of movement of said row following means, whereby said cotton stripping means is adapted to be effective at one point with respect to the approximate longitudinal center line of said row of plants.

10. A cotton picking mechanism comprising row following means adapted to move along a row of plants, movable cotton stripping means carried thereby, means for projecting said cotton stripping means into and retracting the same from said plants, said projecting and retracting means disposing said cotton stripping means in different angular positions with respect to said row of plants, said projecting and retracting means disposing said cotton stripping means angularly in the direction of movement of said row following means during projection, said relative angularity being adapted to increase, the maximum angularity resulting at maximum projection into said plants.

11. A cotton picking mechanism comprising row following means adapted to move along a row of plants, cotton stripping means carried thereby, means operating to shift said cotton stripping means axially and angularly for projecting said cotton stripping means into and retracting the same from said plants, said cotton stripping means being adapted to be angularly disposed with respect to said row of plants in the direction of movement of said row following means during projection, means for advancing said cotton stripping mechanism along a row of plants, and means for driving said projecting and retracting means at such a rate, relative to the rate of movement of said advancing means, that the point of intersection of said cotton stripping means with respect to the approximate center line of said row of plants moves backward with respect to such mechanism at a rate which is substantially equal to the rate of advance.

12. A cotton picking mechanism comprising row following means, means for moving said row following means along a row of plants, cotton stripping means including rapidly rotating means, means for projecting said rotating means into and retracting the same from said plants, and means for causing said rapidly rotating means to assume an angularity in the direction of movement of said row following means during projection and an angularity opposite to the direction of movement of said row following means during retraction, whereby said rapidly rotating means is effective at one point with respect to the approximate center line of said plants during a complete cycle of operation.

13. In a mechanism of the class described, a casing, a vertically disposed standard in said casing, means for oscillating said standard about a vertical axis, and picking needles supported for sliding movement in said standard transversely thereof during oscillatory movement of said standard.

14. In a mechanism of the class described, a casing, a vertically disposed standard journaled in said casing, picking needles supported for sliding movement in said standard transversely thereof, and a second standard shiftably mounted in said casing in spaced relation to said first named standard, said needles having their ends journaled in said second standard.

15. In a mechanism of the class described, a casing, a vertically disposed standard journaled in said casing, picking needles supported for sliding movement in said standard transversely thereof, guiding and supporting means extending laterally from said standard, a second standard receiving said guiding and supporting means and mounted for movement laterally of and toward and away from said first standard, said needles having their ends journaled in said second standard, and means for shifting said second standard in a plurality of directions relative to the first standard, whereby said needles are given a combined reciprocatory and oscillatory movement.

16. In a mechanism of the class described, a casing, a vertically disposed standard journaled in said casing, picking needles supported for sliding movement in said standard transversely thereof, guiding and supporting means extending laterally from said standard, a second standard slidably receiving said guiding and supporting means, extensions on said second standard, and means coacting with said extensions for imparting reciprocatory and oscillatory movement to said second standard.

17. In a mechanism of the class described, a casing, a vertically disposed standard journaled in said casing, picking needles supported for sliding movement in said standard transversely thereof, guiding and supporting means extending laterally from said standard, a second standard slidably receiving said guiding and supporting means, extensions on said second standard, means coacting with said extensions for imparting reciprocatory and oscillatory movement to said second standard, and means for guiding said second standards in a predetermined path.

18. In a mechanism of the class described, a casing, a vertically disposed standard journaled in said casing, picking needles supported for sliding movement in said standard transversely thereof, guiding and supporting means extending laterally from said standard, a second standard slidably receiving said guiding and supporting means, extensions on said second standard, means coacting with said extensions for imparting reciprocatory and oscillatory movement to said second standard, and means for guiding said second standard in a predetermined path, said means for guiding said second standard being effective to move said picking needles through one period of oscillation for a complete cycle of reciprocation.

19. In a mechanism of the class described, a casing, a vertically disposed standard journaled in said casing, picking needles supported for sliding movement in said standard transversely thereof, guiding and supporting means extending laterally from said standard, a second standard slidably receiving said guiding and supporting means, extensions on said guiding means, means coacting with said extensions for imparting reciprocatory and oscillatory movement to said second standard, and cam means for guiding said second standard in a predetermined path, said cam means being pear shaped.

20. In a mechanism of the class described, a casing, picking means supported in said casing comprising a plurality of pivotally supported vertical standards, picking needles slidably and rotatably supported in said standards, a plurality of second standards supported for oscillation and reciprocation, means supporting the rear ends of said picking needles for rotation in said second standards, and means connecting said second standards together for movement in unison.

21. In a mechanism of the class described, a casing, picking means supported in said casing comprising a plurality of pivotally supported vertical standards, picking needles slidably and rotatably supported in said standards, means for rapidly rotating said needles, a plurality of second standards supported for oscillation and reciprocation, said needles having their ends non-slidably journaled in said second standards, means for oscillating and reciprocating said second standards, and means connecting said second standards together for movement in unison whereby said needles are adapted to be moved in unison.

22. In a cotton harvester, the combination with a tractor including a motor, of an attachment comprising a housing, picking means supported in said housing comprising a plurality of pivotally supported vertical standards, picking needles slidably and rotatably supported in said standards, gear means interconnecting said needles for rapid rotation, a plurality of second standards supported for oscillation and reciprocation spaced from said first named standards, said needles having their ends non-slidably journaled in said second standards, means for imparting motion to said second standards, means connecting said second standards for movement in unison, and a power take-off connection for transmitting motion from said motor to said gear means and the motion imparting means, whereby said needles and second standard are adapted to operate simultaneously.

23. In a mechanism of the class described, a casing, plant guiding means exterior of the casing for definitely positioning plants with respect to said casing, picking needles carried by said casing for relative movement with respect thereto, and means for rapidly rotating, reciprocating and oscillating said picking needles whereby they are adapted to be periodically projected into the space defined by said plant guiding means, said picking needles being adapted to be projected into and withdrawn from said plants at substantially point intersection with the approximate center line of said plants.

24. In a mechanism of the class described, a casing, plant guiding means exterior of and spaced from said casing for definitely positioning plants with respect to said casing, a plurality of banks or sections of picking means carried by said casing and adapted to be projected across the space between said guiding means and said casing into the guided plants positioned therein, and means carried by said plant guiding means for receiving the outer ends of said picking means.

25. In a mechanism of the class described, a casing, plant guiding means exterior of and spaced from said casing for definitely positioning plants therebetween, a plurality of banks of picking needles movably carried by and journaled for rotation in said casing, means for rotating said needles and projecting them across the space between said guiding means and said casing into the guided plants positioned in said space, and means carried by said guiding means and disposed on opposite sides of the outermost end portions of said needles when the latter are projected into the plants across the space between said casing and said guiding means.

26. In a mechanism of the class described, a casing having a side wall, picking means supported by said casing and extending beyond said wall, plant guide means supported on the exterior of said wall in spaced relation to said wall, stripping means associated with said picking means for stripping matter therefrom, trough means at the bottom of said guide means including a plurality of ducts having separate upwardly opening inlets disposed in the space defined by said guide means and side wall for receiving matter stripped by said stripping means.

27. In a mechanism of the class described, a frame, a housing having a side wall supported upon said frame, plant stripping means carried by said housing, plant guide means on the exterior of said wall in spaced relation thereto, means for removing matter from said stripping means and for discharging the same into the space between said guide means and said side wall, means at the bottom of said guide means and disposed in the space defined by said guide means and wall for receiving stripped matter removed by said removing means from said stripping means, said receiving means including a plurality of ducts having separate upwardly opening inlets and arranged in said receiving means alongside one another, a common enclosure communicating with the discharge ends of all of said ducts for receiving matter therefrom, and a suction fan on said frame and associated with said common enclosure.

28. In a cotton harvester, a picking spindle, rockably mounted supporting means on which the spindle is mounted for axial reciprocation, and means for simultaneously rocking the supporting means and reciprocating the spindle.

29. In a cotton harvester, a picking spindle, rockably mounted supporting means on which the spindle is journaled for rotation and axial reciprocation, means for rotating the spindle, and means for simultaneously rocking the supporting means and reciprocating the spindle.

30. In a cotton harvester, a picker assembly comprising a shaft, a supporting element having a bearing rockably mounted on the shaft and provided with a second bearing having its axis angularly related to the shaft, a spindle rotatably and reciprocably journaled between its ends in the second bearing, means for rotating the spindle, and means for rocking the supporting element on the shaft and for simultaneously reciprocating the spindle.

31. In combination with a tractor, a cotton picking unit at each side thereof, a frame supported by the tractor, means for supporting the units in the frame for vertical movement, counterbalancing means for the units, picking means in each unit, means in each unit for separating the cotton from the picking means, means for actuating the picking and separating means from the motor of the tractor, a suction device supported by the frame and connected with each unit for drawing the cotton therefrom and means for actuating the suction device from the motor.

32. In combination with a tractor, a cotton picking unit at each side thereof, a frame supported by the tractor, means for supporting the units in the frame for vertical movement, counterbalancing means for the units, picking means in each unit, means in each unit for separating the cotton from the picking means, a motor for actuating the picking and separating means, a suction device supported by the frame and connected with the units for drawing the cotton therefrom and means for actuating the suction device from the motor.

33. The combination with a tractor having a front steering truck, rear traction wheels spaced to span two plant rows and a narrow longitudinally extended body, of a row crop harvesting unit including upright housings located at each side of the body within the tread lines of the traction wheels, means on the body between the axes of the front and rear wheels for suspending one end only of each of the housings in laterally spaced relation to the body, and ground engaging means for supporting the other end of said housings.

34. A self-propelled cotton harvester comprising a narrow longitudinally extending body, a power plant thereon, a narrow tread dirigible truck pivoted on a vertical axis to the forward end of said body, a transversely extended axle structure secured to the rear end of said body, traction wheels on the ends of the axle structure, cotton gathering mechanism supported at one side of the body comprising a housing spaced outwardly from the body to afford a row crop receiving space between the inner side of the housing and the vertical plane in which the side of the body lies, cotton gathering mechanism contained in said housing having gathering elements operating from the inner side of the housing, a wall supported opposite the inner side of the housing and therewith forming a plant row receiving channel, a forward extension on said wall disposed forward of said dirigible truck and forming a plant deflecting means, and a driving connection between the power plant and gathering mechanism.

35. A self-propelled cotton harvester comprising a narrow longitudinally extending body, dirigible supporting means at the front end of said body, a transversely extended axle structure supporting the rear end of the body, axle driving means, traction wheels on the ends of said axle structure, a housing supported at each side of the body and located alongside and extending forwardly of said front supporting means, cotton gathering mechanism contained in said housings having gathering elements operating from the inner sides of the respective housings and across longitudinally extending paths adjacent the opposite sides of the body, and driving connections for the gathering mechanisms.

36. In a cotton harvester, the combination with a tractor, of an attachment comprising a cotton picking mechanism, a frame associated with said mechanism and connected to said tractor, means carried at one end of said mechanism and cooperating with portions of said frame for guiding that end of said mechanism for vertical movement, ground engaging means disposed adjacent the other end of said mechanism, and means carried by said other end of said mechanism and cooperating with said ground engaging means for guiding that end of said mechanism for vertical movement.

37. In a cotton harvester, the combination with a tractor, of an attachment comprising a cotton picking mechanism, a frame associated with said mechanism and connected to said tractor, means on said frame for guiding said mechanism for vertical movement, ground engaging means associated with said mechanism for guiding said mechanism for vertical movement, and means connected with said mechanism and reacting, respectively, against said ground engaging means on said frame for adjusting the position of said mechanism relative to the ground.

38. In a cotton harvester, a plurality of picking spindles, rockably mounted supporting means on which all of said spindles are mounted for rotation and axial reciprocation, means for rotating one of said spindles, means actuated by said one spindle for rotating the remainder, and means for rocking the supporting means and reciprocating all of said spindles.

39. The combination with a tractor having a front steering truck, rear traction wheels spaced to span two plant rows, and a narrow longitudinally extended body, of a row crop harvesting unit including housings located on each side of the body, means on the body serving as a supporting framework for suspending one end of each of the housings in laterally spaced relation to the body, and ground engaging supporting means for the other ends of said housings.

40. The combination with a tractor having a front steering truck, rear traction wheels spaced to span two plant rows, and a narrow longitudinally extended body, of a row crop harvesting unit including housings located on each side of the body, means serving as a supporting framework carried on the tractor body and having laterally directed sections at each side of the tractor body, means suspending the adjacent portions of said housings from said laterally directed sections, additional supporting means for the other ends of said housings, and means cooperating with said suspending means and said last named supporting means for simultaneously raising and lowering both ends of said housings.

41. The combination with a tractor having a front steering truck, rear traction wheels spaced to span two plant rows, and a narrow longitudinally extended body, of a row crop harvesting unit including housings located on each side of the body, a supporting framework secured to the tractor of rocking movement relatively thereto about longitudinal and transverse axes, means suspending the rear ends of said housings from the ends of said laterally disposed framework, and ground engaging mean supporting the forward ends of said housings.

42. The combination with a tractor having a front steering truck, rear traction wheels spaced to span two plant rows, and a narrow longitudinally extended body, of a row crop harvesting unit including housings located on each side of the body, a transverse supporting framework carried by the tractor for movement relatively thereto about transverse and longitudinal axes, the lateral end portions of said framework including vertically arranged members, means carried by the rear ends of said housings and embracing said vertical members, and means supporting said housings including means suspending the rear ends of said housings on said tranverse framework for vertical movement along said vertical members.

43. In an agricultural implement, the combination with a tractor, of an operating mechanism, an attachment comprising a bracket adapted to be secured to said tractor, means comprising an arm extending transversely of the tractor and pivotally connected with said bracket, said arm having laterally directed journal portions thereon, a supporting framework comprising arms connected to said journal portions, laterally outwardly extending arms carried by said supporting framework, and means for supporting said operating mechanism on said laterally extending arms.

44. In an agricultural implement, the combination with a tractor, of an operating mechanism, an attachment comprising a bracket secured to the tractor, means comprising an arm pivotally connected with said bracket for movement relative thereto about a fore and aft axis, said arm having laterally directed journal portions thereon, a supporting framework comprising members connected to said journal portions for movement relative thereto about a transverse axis, laterally outwardly directed arms carried on the framework, means for supporting the rear end of said mechanism on said laterally directed arms, and second supporting means for the forward end of said operating mechanism.

45. In an agricultural implement, the combination with a tractor, of an operating mechanism, a transverse supporting framework carried on the tractor for supporting one end of said operating mechanism thereon, ground engaging means for supporting the other end of said mechanism, each of said supporting means having vertically disposed members, means slidably connecting said mechanism with said vertically disposed members, and means reacting against said supporting means for raising and lowering said mechanism relative to said vertical members.

46. In an agricultural machine, the combination with a tractor, of an attachment comprising an operating mechanism, a frame associated with said mechanism and connected to said tractor, means on said frame for guiding said mechanism for vertical movement, means connected to said frame and mechanism for supporting one end of said mechanism, ground engaging means associated with said mechanism for guiding said mechanism for vertical movement, and means connecting said ground engaging means and said mechanism for supporting the other end of said mechanism.

47. In an agricultural machine, the combination with a tractor, of an attachment comprising an operating mechanism, a frame associated with said mechanism and connected to said tractor, means on said frame for guiding said mechanism for vertical movement, adjustable means connected to said frame and mechanism for supporting one end of said mechanism, ground engaging means associated with said mechanism for guiding said mechanism for vertical movement, adjustable means connecting said ground engaging means and said mechanism for supporting the other end of said mechanism, and common means for controlling both of said adjustable means for effecting movement of said mechanism relative to the ground.

48. In an agricultural machine, the combination with a tractor, of an attachment comprising an operating mechanism, a frame supported on said tractor for movement about a plurality of axes, a transverse member on said frame extending laterally of said tractor, a guide depending from said member and having sliding connection with one end of said mechanism, a caster having a pintle slidably associated with the other end of said mechanism, and means reacting against said member and said pintle for supporting said mechanism.

49. In an agricultural machine, the combination with a tractor, of an attachment comprising an operating mechanism, a frame supported on said tractor for movement about a plurality of axes, a transverse member on said frame extending laterally of said tractor, a guide depending from said member and having sliding connection with one end of said mechanism, a caster having a pintle slidably associated with the other end of said mechanism, and means connecting said member and said pintle for supporting said mechanism in parallel relation to a line connecting the supporting points on said arm and pintle.

50. In an agricultural machine, the combination with a tractor, of an attachment comprising an operating mechanism, a frame supported on said tractor for movement about a plurality of axes, a transverse member on said frame extending laterally of said tractor, a guide depending from said member and having sliding connection with one end of said mechanism, a caster having a pintle slidably associated with the other end of said mechanism, a bell-crank connecting said member and the respective end of said mechanism, a second bell-crank connecting the upper end of said pintle and the respective end of said mechanism, and means connected with said bell-cranks for adjusting the position of said mechanism relative to said transverse member and pintle.

51. In an agricultural machine, the combination of an operating mechanism adapted to be mounted on a tractor, a frame slidably supporting one end of said mechanism, said frame being connected with said tractor for movement about a plurality of axes, means slidably supporting the other end of said mechanism, and means connected to said tractor and to said supporting means for bracing said other end of said mechanism with respect to said tractor.

52. In an agricultural machine, the combination of an operating mechanism adapted to be mounted on a tractor, a frame carried by the tractor and slidably supporting one end of said mechanism, means connecting said frame with said tractor for movement relative thereto about a plurality of axes, ground engaging means slidably supporting the other end of said mechanism, means connected to said tractor and to said means for bracing said other end of said mechanism with respect to said tractor, said last mentioned means having universal connection with the tractor, one axis of which is in alignment with a similarly disposed axis of said frame connection.

FREDERICK A. THOMANN.

CERTIFICATE OF CORRECTION.

Patent No. 2,004,713.             June 11, 1935.

FREDERICK A. THOMANN.

It is hereby certified that error appears in the printed specification of the above numbered patent requiring correction as follows: Page 2, first column, line 8, and page 5, second column, line 33, for "mechanism" read mechanisms; page 6, first column, line 48, for "substantially" read substantial; page 7, first column, line 13, for "inturn" read in turn; and second column, line 22, for "blank" read bank; page 8, first column, line 37, for "235" read 325; page 13, first column, line 16, claim 41, for "of" read for; and same claim, line 20, for "mean" read means; and that the said Letters Patent should be read with these corrections therein that the same may conform to the record of the case in the Patent Office.

Signed and sealed this 16th day of July, A. D. 1935.

Leslie Frazer (Seal)             Acting Commissioner of Patents.